United States Patent
Graham

(10) Patent No.: US 12,496,385 B2
(45) Date of Patent: Dec. 16, 2025

(54) PERITONEAL DIALYSIS CATHETER WITH AN EXPANDABLE STRUCTURE

(71) Applicant: GRAHAM BRASWELL BIOTECHNOLOGIES INC., New York, NY (US)

(72) Inventor: Jay Alexander Graham, Putnam Valley, NY (US)

(73) Assignee: GRAHAM BRASWELL BIOTECHNOLOGIES INC., New York, NY (US)

( * ) Notice: Subject to any disclaimer, the term of this patent is extended or adjusted under 35 U.S.C. 154(b) by 944 days.

(21) Appl. No.: 17/698,983

(22) Filed: Mar. 18, 2022

(65) Prior Publication Data

US 2023/0015625 A1  Jan. 19, 2023

Related U.S. Application Data

(60) Provisional application No. 63/312,739, filed on Feb. 22, 2022, provisional application No. 63/282,558,
(Continued)

(51) Int. Cl.
*A61M 1/28* (2006.01)
*A61M 25/00* (2006.01)
(Continued)

(52) U.S. Cl.
CPC ........ *A61M 1/285* (2013.01); *A61M 25/0026* (2013.01); *A61M 25/007* (2013.01); *A61M 2025/0057* (2013.01); *A61M 25/0068* (2013.01); *A61M 25/0102* (2013.01); *A61M 25/04* (2013.01); *A61M 25/1002* (2013.01);
(Continued)

(58) Field of Classification Search
CPC ........ A61M 1/28; A61M 1/281; A61M 1/282; A61M 1/284; A61M 1/285; A61M 1/287; A61M 1/288; A61M 2210/1017; A61M 2210/1078; A61M 2210/1082; A61M 2210/1085; A61M 2210/1089;
(Continued)

(56) References Cited

U.S. PATENT DOCUMENTS 3,815,608 A * 6/1974 Spinosa ................ A61M 25/04
  604/105
4,351,333 A * 9/1982 Lazarus .............. A61M 25/002
  604/164.11
(Continued)

FOREIGN PATENT DOCUMENTS

EP  2575703 B1  7/2015
WO  2020146454  7/2020

OTHER PUBLICATIONS https://www.medtronic.com/covidien/en-us/products/dialysis-access/peritoneal/argyle-catheters.html, accessed Mar. 16, 2022.
(Continued)

*Primary Examiner* — Nathan R Price
(74) *Attorney, Agent, or Firm* — Reed Smith LLP; Richard J. Brown

(57) ABSTRACT

Disclosed are peritoneal dialysis catheters comprising a distal region comprising a perforated portion and one or more expandable member configured to float the catheters on dialysate fluid within the peritoneal cavity of a patient, and methods for using the catheters.

21 Claims, 18 Drawing Sheets

Related U.S. Application Data filed on Nov. 23, 2021, provisional application No. 63/223,452, filed on Jul. 19, 2021.

(51) Int. Cl.

| | | |
|---|---|---|
| *A61M 25/01* | (2006.01) | |
| *A61M 25/04* | (2006.01) | |
| *A61M 25/10* | (2013.01) | |

(52) U.S. Cl.
CPC . *A61M 25/1011* (2013.01); *A61M 2025/1043* (2013.01); *A61M 2025/1079* (2013.01); *A61M 2025/1081* (2013.01)

(58) Field of Classification Search
CPC .. A61M 2210/1092; A61M 2210/1096; A61M 2025/1081
See application file for complete search history.

(56) References Cited

U.S. PATENT DOCUMENTS

| | | | |
|---|---|---|---|
| 4,935,004 A | | 6/1990 | Cruz |
| 5,213,576 A | | 5/1993 | Abluso et al. |
| 5,487,730 A | * | 1/1996 | Marcadis ............... A61M 25/10 604/103.07 |
| 5,997,546 A | | 12/1999 | Foster et al. |
| 6,659,134 B2 | | 12/2003 | Navis |
| 6,743,198 B1 | * | 6/2004 | Tihon ................. A61M 27/008 604/174 |
| 7,320,674 B2 | | 1/2008 | Ruddell et al. |
| 7,806,870 B2 | | 10/2010 | Mastri et al. |
| 8,721,520 B2 | | 5/2014 | Caira et al. |
| 10,105,226 B2 | * | 10/2018 | Zimmerman .......... A61F 2/2466 |
| 10,398,824 B2 | | 9/2019 | Burnett et al. |
| 10,940,287 B2 | * | 3/2021 | Nasser ................... A61B 5/204 |
| 2003/0004493 A1 | | 1/2003 | Casey et al. |
| 2006/0079845 A1 | | 4/2006 | Howard et al. |
| 2006/0142731 A1 | * | 6/2006 | Brooks ................. A61M 25/04 604/530 |
| 2008/0262406 A1 | | 10/2008 | Wiener |
| 2009/0018493 A1 | | 1/2009 | Ash et al. |
| 2009/0312807 A1 | * | 12/2009 | Boudreault ........ A61B 17/3421 606/86 R |
| 2012/0033023 A1 | | 2/2012 | Watanabe et al. |
| 2014/0114432 A1 | * | 4/2014 | Shalon ..................... A61F 2/04 623/23.65 |
| 2016/0367747 A1 | | 12/2016 | Loske |
| 2017/0056575 A1 | | 3/2017 | Hahne et al. |
| 2019/0105474 A1 | * | 4/2019 | Sheibley ............... A61M 29/02 |
| 2020/0269024 A1 | | 8/2020 | Boubes |
| 2020/0297980 A1 | | 9/2020 | Murphy et al. |
| 2021/0178130 A1 | | 6/2021 | Betelia |

OTHER PUBLICATIONS

International Search Report for PCT counterpart application serial No. PCT/US2022/21039, dated Jun. 14, 2022.
Extended Search Report for corresponding EPO application 22846361.8, dated Apr. 14, 2025.
International Preliminary Report on Patentability for PCT counterpart application serial No. PCT/US2022/21039, mailed Feb. 1, 2024.

* cited by examiner

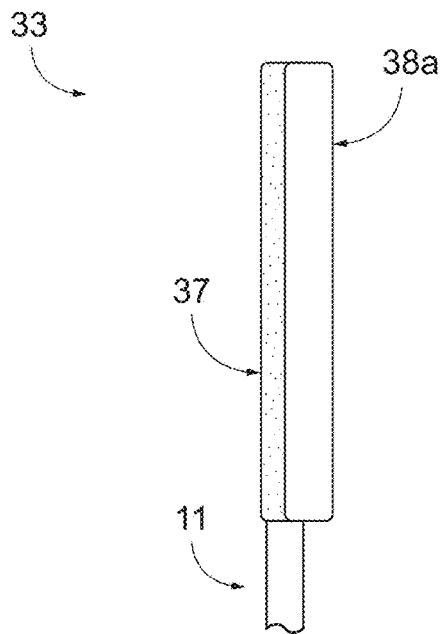 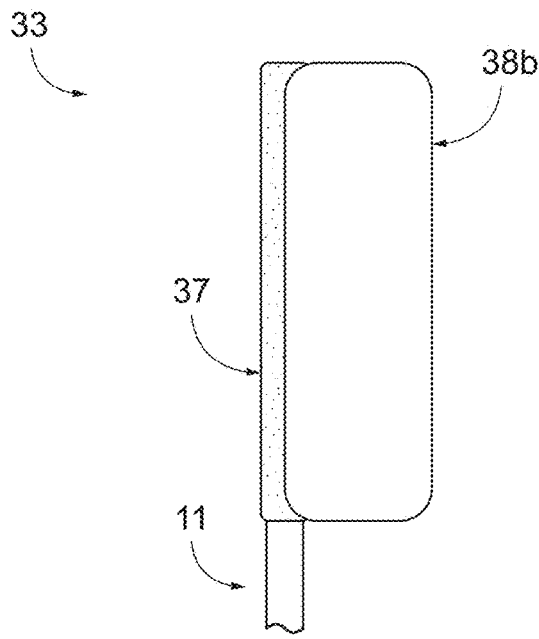
FIG. 4A  FIG. 4B
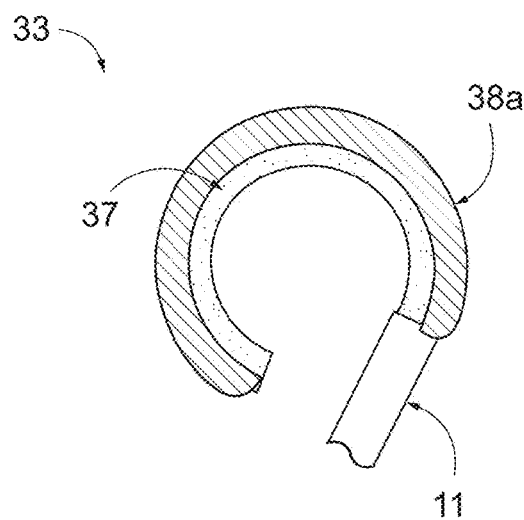 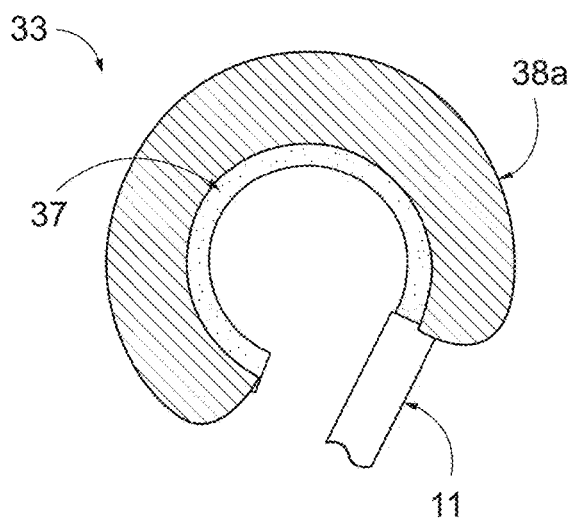
FIG. 5A  FIG. 5B

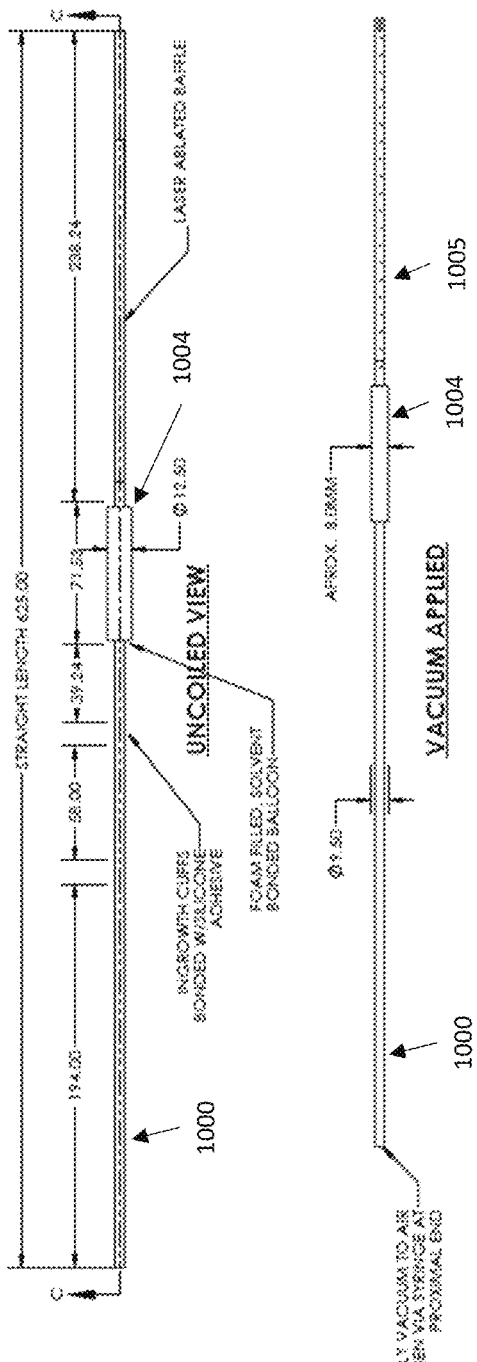
Fig. 10C
Fig. 10D
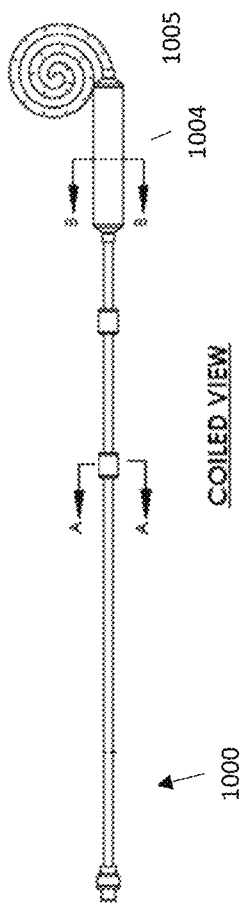
Fig. 10E

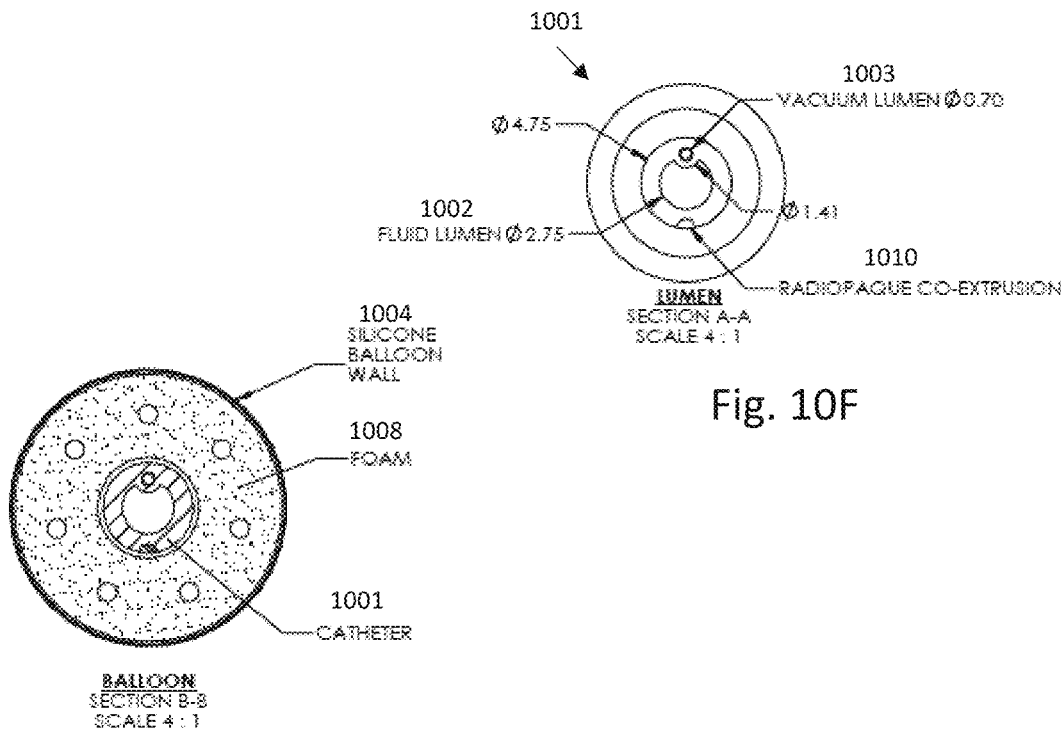
Fig. 10F
Fig. 10G
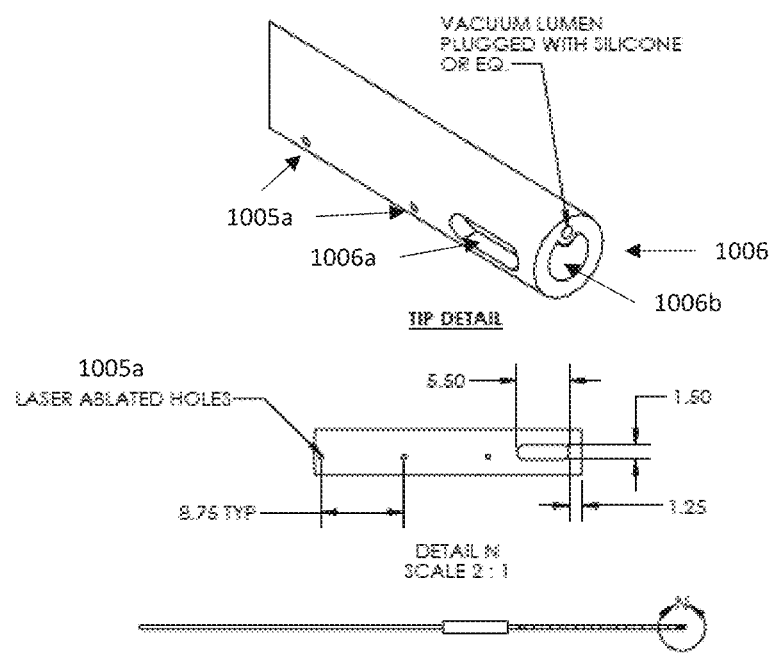
Fig. 10H

Fig. 10L
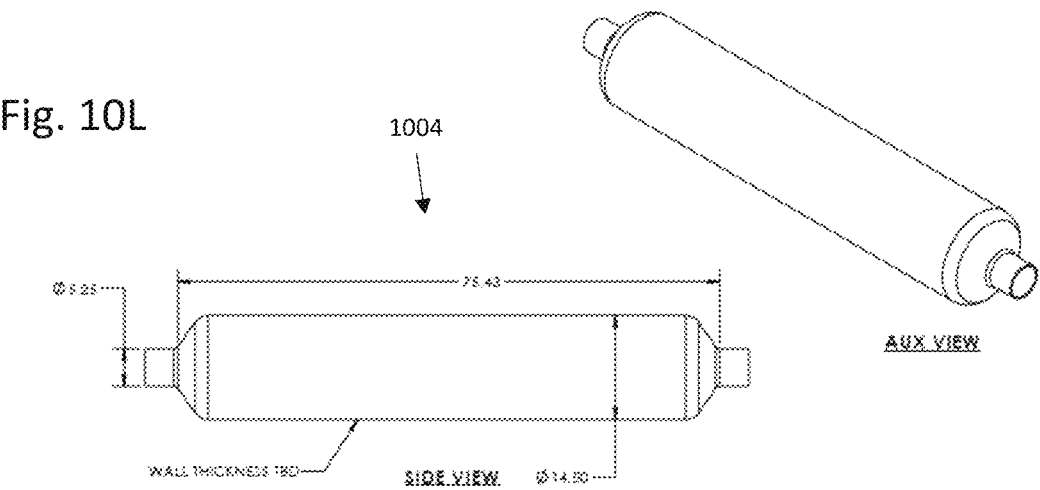
Fig. 10M
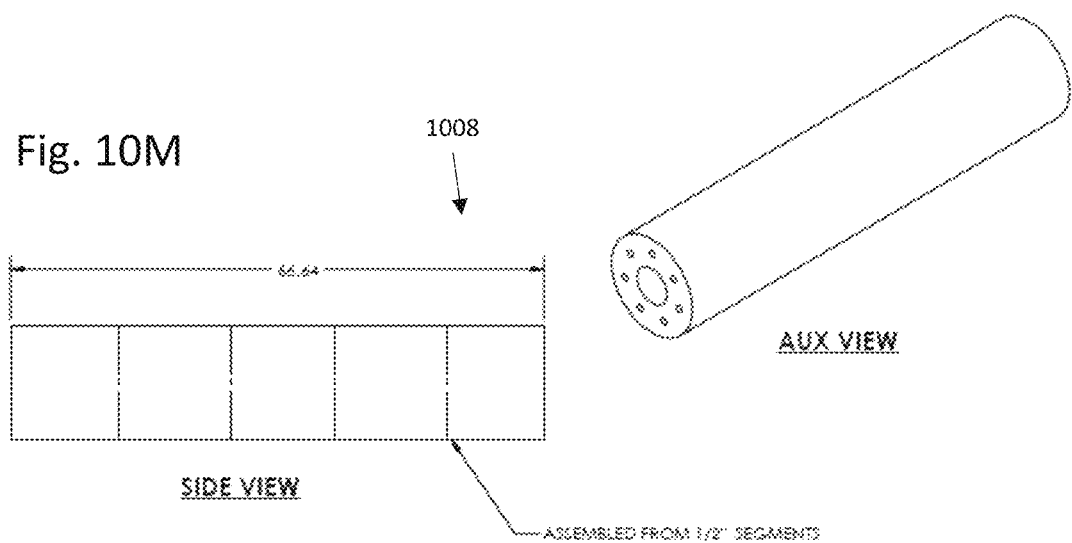
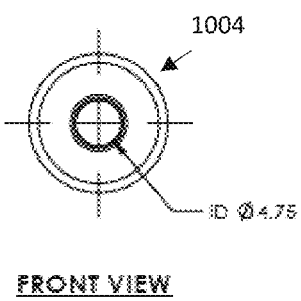
FRONT VIEW
Fig. 10N
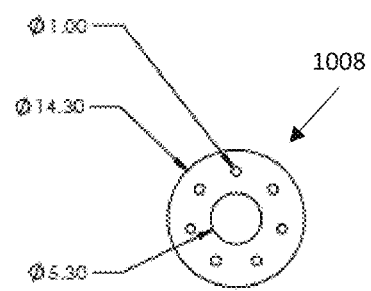
FRONT VIEW
Fig. 10O

PERITONEAL DIALYSIS CATHETER WITH AN EXPANDABLE STRUCTURE

CROSS-REFERENCE TO RELATED APPLICATIONS

This application claims the benefit of priority to U.S. Patent Application Ser. No. 63/223,452 filed Jul. 19, 2021, U.S. Patent Application Ser. No. 63/282,558 filed Nov. 23, 2021 and U.S. Patent Application Ser. No. 63/312,739 filed Feb. 22, 2022, and the entire contents of each are incorporated herein by reference.

FIELD OF THE DISCLOSED SUBJECT MATTER

This disclosure relates to medical devices for use in peritoneal dialysis and to methods of using such devices.

BACKGROUND OF THE DISCLOSED SUBJECT MATTER

End-stage renal disease (ESRD) occurs when the kidneys fail to support the body's needs in the last stage of chronic kidney disease (CKD). When this occurs, dialysis is required to help remove impurities and waste from the blood. The most commonly performed types of dialysis that are hemodialysis and peritoneal dialysis.

For hemodialysis patients, the creation of vascular access in the form of an arteriovenous fistula (AVF) or arteriovenous graft (AVG) is vital. However, these vascular access points need time to mature (6 weeks to 4 months). During this time the patient still needs an outlet for dialysis to be performed, which is usually accomplished by utilizing a central venous catheter (CVC) as the initial dialysis access for hemodialysis. This type of catheter is problematic due to the high rate of infection, negatively impacting the patients' quality of life. CVC infections are dangerous, costly, and can cause complications that can lead to sepsis and death. Catheter related blood stream infections (CRESIs) caused by CVCs are also the leading source of nosocomial infections in the United States.

CVCs are also used for patients with acute kidney injury (AKI) or acute early stage chronic kidney disease (ACKD). The disadvantage of CVC in this case is the decline of the estimated glomerular filtration rate (eGFR); it is even more rapid compared to hemodialysis using AVF.

In comparison with hemodialysis, peritoneal dialysis can better help preserve the residual renal function (RRF). The initiation of peritoneal dialysis is advantageous to let the kidney heal and restore its functions.

Peritoneal dialysis utilizes a dialysis solution and dialysate, which is infused into a patient's peritoneal cavity. The dialysate contacts the patient's peritoneal membrane in the peritoneal cavity. Waste, toxins, and excess water pass from the patient's bloodstream through the peritoneal membrane and into the dialysate. The transfer of waste, toxins and water from the bloodstream into the dialysate occurs due to diffusion and osmosis. The spent dialysate is drained from the patient's peritoneal cavity to remove the waste, toxins and water from the patient and then may be replaced in additional dialysis cycles.

In current methods of peritoneal dialysis, peritoneal dialysis catheters (PDC) are used as an alternative to hemodialysis. Peritoneal dialysis catheters are used to transfer the fresh dialysate into the peritoneal cavity and remove spent dialysate from the cavity. PDCs are placed inside the abdomen and use the peritoneum as the exchange medium for waste. A PDC is inserted through the skin, subcutaneous fat, rectus muscle, and parietal peritoneum into the peritoneal cavity. DACRON cuff(s) may be placed in contact with the rectus muscle to encourage better attachment to the surrounding tissue. A healing period of 2-3 weeks is needed in order to prevent inflammation and infection of the exit site and tunneled area. Fluid (dialysate) is introduced into the peritoneal cavity through the PDC, and then held in the cavity by closing the proximal end of the catheter to prevent outflow of fluid. Bodily waste by-products are drawn through the peritoneum into the peritoneal cavity and absorbed into the dialysate. After some dwell time, the proximal end of the PDC is then opened and fluid is drained from the peritoneal cavity.

Typically, a peritoneal catheter is implanted into the peritoneal cavity and remains implanted for an extended period of time. For example, the average catheter may remain implanted for about 18-24 months, but it is not unusual for a catheter to remain indwelling for more than 2 years.

There are a number of complications associated with PDCs, but slow draining is a particular annoyance. Slow drainage occurs when the bowel covers the small holes in the distal end of the PDCs as the dialysate fluid level drops. In general, 1-3 liters of dialysate is introduced into the abdomen of patients. For correct fluid and electrolyte balance patients need to evacuate this entire amount. However, drainage can be encumbered if there is not enough dialysate fluid to keep the bowels from temporarily plugging the holes in the PDC as the fluid drains. Current PDCs comprise silicone rubber and sink to the most dependent portion of the body, which heightens the chance of the bowel blocking the holes.

It is desirable to develop improved peritoneal dialysis catheters to provide more complete fluid drainage.

SUMMARY OF THE DISCLOSED SUBJECT MATTER

One aspect provides an elongated tubular member comprising a proximal region, a distal region, and a wall defining a first lumen and a second lumen extending from the proximal region to the distal region, wherein a portion of the wall disposed at the distal region includes perforations in fluid communication with the first lumen, and an expandable member disposed on the tubular member in fluid communication with the second lumen; wherein the first lumen is a fluid lumen and the second lumen is an inflation lumen.

In embodiments, the expandable member may be disposed longitudinally along a portion of the distal region. The expandable member may be sized to encapsulate at least a portion of a circumference of at least a portion of the elongated tubular member, such as wherein the expandable member fully encapsulates at least a portion of the elongated tubular member.

In embodiments, the expandable member may be disposed at the distalmost end of the tubular member and the wall portion comprising the plurality of perforations is disposed proximally to the expandable member. In other embodiments, the wall portion comprising the plurality of perforations is disposed along the elongated tubular member distal to the expandable member.

In embodiments, the wall comprising the plurality of perforations has a curved configuration, such as a spiral shape.

The expandable member may comprises a material selected from the group consisting of a nylon, polyamide, polyolefin, polyester, polyurethane, fluoropolymer, polyethylene, polytetrafluoroethylene (PTFE), polyethyleneterephthalate (PET), polyvinyl chloride, latex, natural rubber, synthetic rubber, elastomer, silicone and mixtures and copolymers thereof.

In embodiments, the elongated tubular member further comprises at least one cuff positioned on the wall of the elongated tubular member at the proximal region, such as first and second cuffs.

In embodiments, the expandable member comprises a balloon, or the expandable member comprises an elastomeric sheath that defines a cavity and open cell foam therein.

In embodiments, the wall of the elongated tubular member further comprises a radiopaque stripe extending from the proximal region to the distal region. The elongated tubular member may further comprise a retractable sheath.

In embodiments, the elongated tubular member may further comprise a fitting mechanism operatively engaged to the proximal region of the elongated tubular member, wherein the fitting mechanism is capable of controlling fluid flow through the first lumen. The fitting mechanism may comprise a passage in fluid communication with the first lumen, and/or a passage in fluid communication with the second lumen.

In a specific embodiment, the device comprises an elongated tubular member comprising a proximal region, a distal region, and a wall comprising a radiopaque stripe extending from the proximal region to the distal region, wherein the wall defines a first lumen and a second lumen extending from the proximal region to the distal region, wherein the first lumen is a fluid lumen and the second lumen is an inflation lumen, and a portion of the wall disposed at the distalmost end of the distal region is configured in a spiral shape and includes a plurality of perforations in fluid communication with the first lumen; an expandable member longitudinally disposed on the tubular member to fully encapsulate at least a portion of the elongated tubular member along a portion of the distal region proximally disposed to the perforated portion of the wall, wherein the expandable member comprises a sheath defining a cavity containing open cell foam that is in fluid communication with the second lumen; and a first cuff and a second cuff positioned spaced apart on the wall of the elongated tubular member at the proximal region.

In this embodiment, the elongated tubular member may further comprise a fitting mechanism operatively engaged to the proximal end of the elongated tubular member, wherein the fitting mechanism comprises a first passage in fluid communication with the first lumen and is capable of controlling fluid flow through the first lumen, and a second passage in fluid communication with the second lumen.

Another aspect provides a kit comprising the device as described above, including embodiments thereof, and a fitting mechanism configured to engage the device, wherein the fitting mechanism is capable of controlling fluid flow through the first lumen when engaged to the device. The fitting mechanism may comprise a passage configured to be in fluid communication with the first lumen and/or a passage configured to be in fluid communication with the second lumen.

In a specific embodiment of the kit, the device comprises an elongated tubular member comprising a proximal region, a distal region, and a wall comprising a radiopaque stripe extending from the proximal region to the distal region, wherein the wall defines a first lumen and a second lumen extending from the proximal region to the distal region, wherein the first lumen is a fluid lumen and the second lumen is an inflation lumen, and a portion of the wall disposed at the distalmost end of the distal region is configured in a spiral shape and includes a plurality of perforations in fluid communication with the first lumen; an expandable member longitudinally disposed on the tubular member to fully encapsulate at least a portion of the elongated tubular member along a portion of the distal region proximally disposed to the perforated portion of the wall, wherein the expandable member comprises a sheath defining a cavity containing open cell foam that is in fluid communication with the second lumen; and a first cuff and a second cuff positioned spaced apart on the wall of the elongated tubular member at the proximal region. The fitting mechanism is configured to operatively engage the proximal end of the elongated tubular member, wherein the fitting mechanism comprises a first passage configured to be in fluid communication with the first lumen and the fitting mechanism is capable of controlling fluid flow through the first lumen when the fitting mechanism is engaged to the proximal end, and a second passage configured to be in fluid communication with the second lumen when the fitting mechanism is engaged to the proximal end.

Embodiments of the kit may further comprise a stylet to guide insertion of the catheter into a subject peritoneal cavity and/or a cutting tool to create an opening into the peritoneal cavity to insert the catheter.

Another aspect provides a method for performing peritoneal dialysis, comprising inserting the distal region of the device as described above, including any embodiments, through an opening in an abdominal wall of a subject in need of dialysis; inflating the expandable member through the second lumen; introducing a fluid into the abdomen through the first lumen; maintaining the fluid in the abdomen for a time sufficient for waste products to diffuse into the fluid from blood vessels surrounding the abdomen; and removing the fluid from the abdomen through the first lumen.

Yet another aspect provides a method for treating a subject in need of peritoneal dialysis, comprising inserting the distal region of the device of any of claims 1 through 20 through an opening in an abdominal wall of the subject; inflating the expandable member through the second lumen; introducing a fluid into the abdomen through the first lumen; maintaining the fluid in the abdomen for a time sufficient for waste products to diffuse into the fluid from blood vessels surrounding the abdomen; and removing the fluid from the abdomen through the first lumen.

In embodiments of either of these methods, the device may further comprise a retractable sheath and the method further comprises retracting the retractable sheath prior to expanding the expandable structure.

In embodiments of either of these methods, the method may further comprise deflating the expandable member after the fluid is removed from the abdomen.

BRIEF DESCRIPTION OF THE DRAWINGS

The invention may be more fully understood by reading the following description in conjunction with the drawings, in which:

FIGS. 4A and 4B depict schematic side-view illustrations of another embodiment of a catheter according to an exemplary embodiment of the disclosed subject matter.

FIGS. 5A through 5C depict schematic illustrations of curved embodiments of a catheter according to an exemplary embodiment of the disclosed subject matter.

DETAILED DESCRIPTION OF THE DISCLOSED SUBJECT MATTER

Figure 1A:
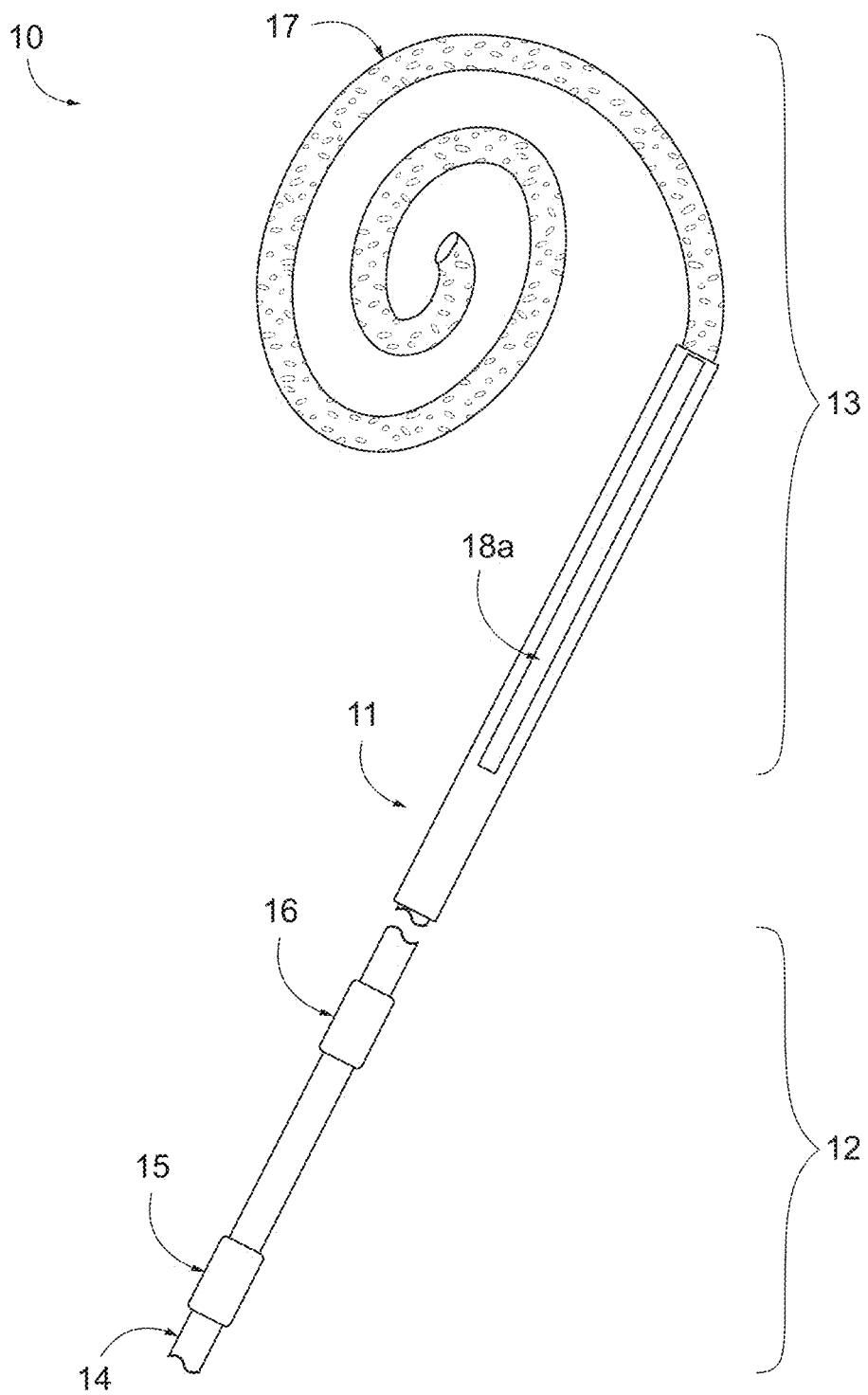
FIGS. 1A and 1B depict schematic illustrations of one embodiment of a catheter according to an exemplary embodiment of the disclosed subject matter.

Unless otherwise defined, all technical and scientific terms used herein have the same meaning as commonly understood by one of ordinary skill in the art to which this invention pertains. In case of conflict, the present document, including definitions, will control. Preferred methods and materials are described below, although methods and materials similar or equivalent to those described herein can be used in the practice or testing of the present invention. The materials, methods, and examples disclosed herein are illustrative only and not intended to be limiting.

As used herein the terms "comprise(s)," "include(s)," "having," "has," "can," "contain(s)," and variants thereof, are intended to be open-ended transitional phrases, terms, or words that do not preclude the possibility of additional acts or structures. The present disclosure also contemplates other embodiments "comprising," "consisting essentially of," and "consisting of" the embodiments or elements presented herein, whether explicitly set forth or not.

Benefits of an indwelling catheter system include the option of at-home treatment, lower cost compared to hemodialysis, and clinical efficiencies.

Conventional peritoneal dialysis (PD) catheter products are single lumen catheters to allow consistent bi-directional flow of dialysate into and out of the abdominal cavity. One or more cuffs are bonded onto the catheter tubing, which allows for tissue ingrowth to maintain placement of the catheter. The catheters may come in a variety of lengths and cuff configurations, including straight, curled, and swan neck catheter styles. The catheters are made of translucent silicone rubber tubing containing a radiopaque stripe, with felt cuffs available to provide catheter stabilization by virtue of tissue ingrowth. Current challenges for an indwelling catheter system include blockage by bowel, pain and incomplete drainage.

Provided herein is a peritoneal dialysis system with a buoyant catheter to facilitate positioning of the catheter to minimize the chances of blockage of the catheter being blocked by the bowel. The catheter system described herein is indicated for acute and chronic peritoneal dialysis. The peritoneal dialysis catheter may be inserted using open, laparoscopic, or percutaneous surgical techniques.

As used herein the terms "proximal" and "distal" are used to describe the opposing axial ends of the device, as well as the axial ends of various component features of the device. The term "proximal" is used in its conventional sense to refer to the end of the device (or component of the device) that is closer to the medical professional during use of the device. The term "distal" is used in its conventional sense to refer to the end of the device (or component of the device) that is initially inserted into the patient, or that is farther from the medical professional during use of the device. For illustration, the distal region of the catheter described herein is inserted into the peritoneal cavity of a patient and fluid is transferred into and out of the peritoneal cavity via the proximal end.

As used herein, the terms "expandable member" or "expandable structure", used interchangeably herein, refer to a flexible or elastomeric sheath that can be stretched or expanded from a compressed state having a small volume to an expanded state having a larger volume. As a result, the expandable structure in its expanded state has a density less that the structure in its compressed state, allowing the expandable structure to float in a body cavity filled with bodily fluids. Notably, the sheath is fluid- and air-tight to prevent leakage of fluid into the structure or gas out of the structure.

As used herein, the term "balloon" refers to an expandable member or structure comprising an inflatable, flexible or elastomeric bag or sheath defining an interior cavity that can filled with a gas, such as helium, hydrogen, nitrous oxide, oxygen, or air in its expanded state. Specifically, the interior of the sheath does not contain material and the interior of the sheath contains only gas when in its expanded state. In embodiments, the balloon is configured in a flat, puckered, wrinkled or folded state such that the cavity is minimized for insertion into a subject's body cavity, and then inflated using a gas such as air introduced via, for example, an inflation lumen in the catheter.

Alternatively, the expandable member can comprise an expandable sheath defining a cavity comprising an open cell foam within the cavity. In embodiments, the open cell foam is held in a compressed state for insertion into a subject's body cavity and then inflated or expanded after insertion. In embodiments, an open cell expandable structure can be inflated like a balloon using gas introduced via an inflation lumen. In other embodiments, the open cell structure is compressed by drawing a vacuum through the inflation lumen. When the vacuum is released, air into the inflation lumen and into the open cell structure, thereby expanding the open cell structure. In other embodiments, the open cell structure may be self-inflating, wherein the open cell foam is held in a compressed state until compression is released, such as by opening a valve, thereby allowing rapid expansion of the open cell foam, creating a vacuum that draws gas into the expanding open cells from the inflation lumen.

In any of the foregoing embodiments, the catheter may further comprise a retractable non-elastomeric or non-expandable sheath disposed radially around the expandable member to prevent expansion of the expandable member until it is desired to be inflated. For example, the non-expandable sheath may be retracted from around the expandable member after insertion into the subject. Retraction of the non-expandable sheath allows for inflation of the balloon or open cell foam with gas introduced via the inflation lumen. In self-inflating embodiments, retraction of the non-expandable sheath can function as a "valve" to allow the compressed open cell foam to expand.

The expandable structures described herein provide a portion of the catheter at its distal region that is of reduced density, allowing the distal region of the catheter to float near the upper portion of peritoneal fluid within the peritoneal cavity to facilitate drainage.

For the purposes of promoting an understanding of the principles and features of the catheter and methods for its use, specific language describes the embodiments illustrated in the drawings. Nevertheless, the scope of the device is not limited to the specific language used, and alterations and modifications in the illustrated device, and further applications of the features of the catheter as illustrated herein are contemplated, as would normally occur to one skilled in the art to which the invention relates.

Although the device describe herein may take many different forms, preferred embodiments are described in this disclosure and shown in the attached drawings. This disclosure exemplifies the principles of the disclosed device and does not limit the broad aspects of the device and methods for its use only to the illustrated embodiments.

Aspects of this disclosure provide a medical device or catheter for performing peritoneal dialysis.

Figure 1B:
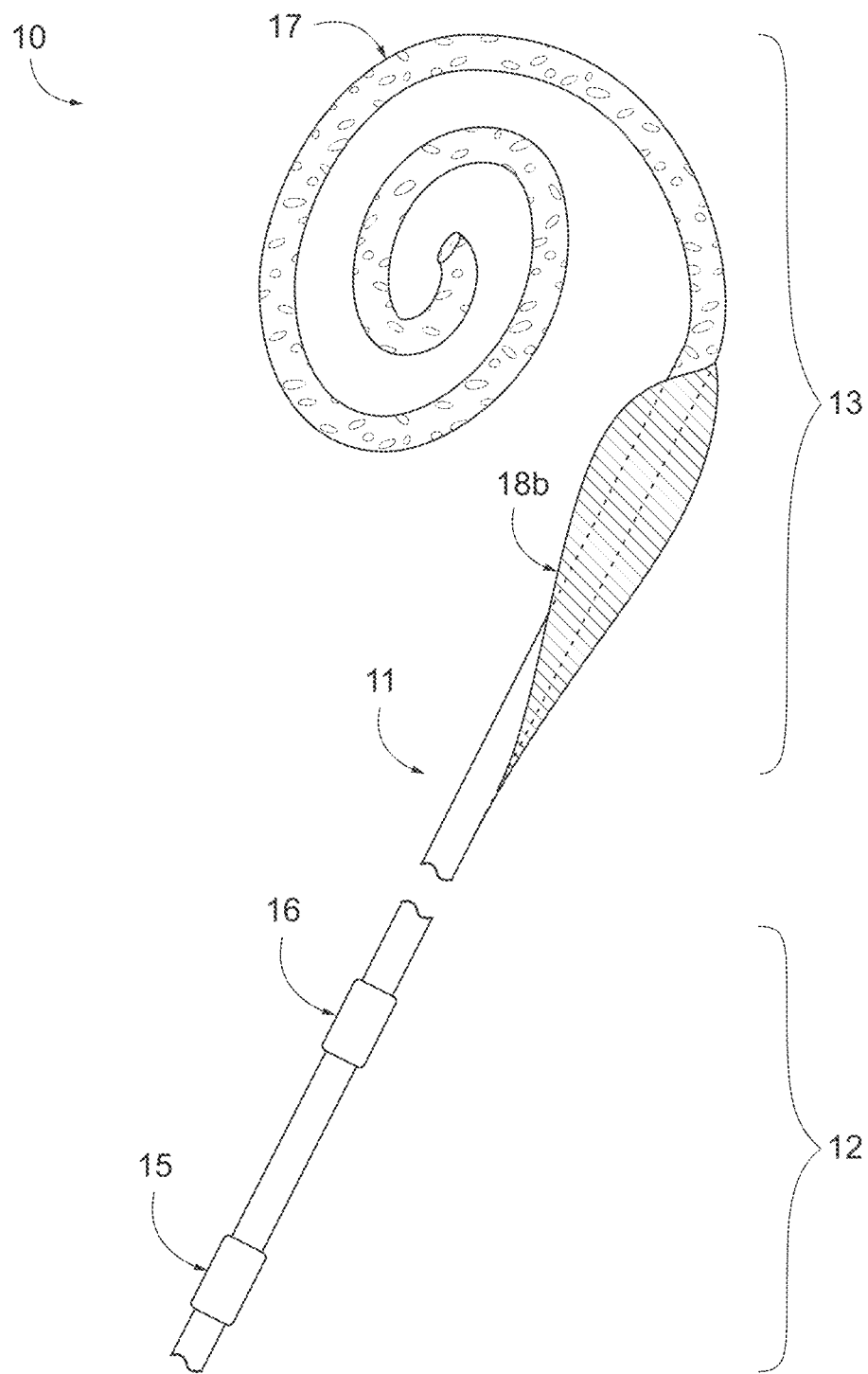

Referring now to FIGS. 1A and 1B, there is illustrated a first embodiment of such a device. Catheter 10 includes a flexible elongated tubular member 11 having a first internal lumen (not shown) extending from proximal region 12 to distal region 13. The lengths and shapes of the sections 11, 12, and 13 can vary depending on the embodiment of the catheter. For ease of presentation, the length of the elongated tubular member is shown with a break along its length and the length of the tubular member can be sized to fit within the abdominal cavity of a patient. The wall of the elongated tubular member 11 within the proximal region and a portion of the distal region is free of an opening that would provide a fluid path between the first lumen and an exterior of the device, except in a perforated segment of the distal region further described below. The catheter 10 is made of flexible medical grade tubing suitable for implanting inside a patient. In various embodiments, the thickness of the wall along at least a portion of the elongated tubular member is between 2 mm and 0.25 mm, or 2 mm and 0.5 mm, or 1.5 mm and 0.5 mm or 1.0 mm and 0.5 mm or 2 mm and 1.0 mm or 0.25 mm and 0.5 mm, or 0.25 mm and 0.4 mm, or 0.25 mm and 0.3 mm.

The proximal region 12 of the catheter 10 provides the function of connecting the catheter 10 to a dialysate supply and removal system, such as an automated peritoneal dialysis system (not shown). The proximal region 12 comprises an end 14 configured to be attached via a connector fitting and tubing to a dialysate supply and removal system wherein the lumen can transfer fluid between the peritoneal cavity and the dialysate supply and removal system. External tubing or lumen (not shown) is disposed external to the patient and is connected to the automated peritoneal dialysis system and the proximal region 12 and provides fluid communication therebetween. The catheter 10 may have a generally vertical orientation when implanted into the patient, with the distal region 13 positioned upward, toward the upper area of the peritoneal cavity. The proximal region 12 may be positioned downward toward the bottom of the peritoneal cavity.

The proximal region 12 may also provide for anchoring the catheter 10 to the patient. One or more implant cuffs 15, 16 on the wall of the elongated tubular member at the proximal region 12 anchor the catheter 10 to the patient. The catheter 10 is implanted into the patient with the cuff 15 positioned just below the patient's skin and the cuff 16 imbedded in the patient's rectus muscle.

The cuff(s) may provide for improved sealing of the catheter entry opening. The cuff(s) may be formed from a material including, for example, polyethylene terephthalate (e.g. DACRON) or another biocompatible polymer material. The implant cuffs 15, 16 can be polyester felt or other material which allows tissue ingrowth into the cuffs. The subcutaneous tissue can grow into the implant cuffs 15, 16 to anchor the catheter 10 to the patient.

In other embodiments, the cuff includes a remodelable material. Such a remodelable material is capable of remodeling or promoting cell growth and/or promoting regrowth and healing of damaged tissue structures. The presence of such a remodelable material may encourage cellular ingrowth and affixing of the catheter into the rectus sheath. This may help stabilize the catheter and provide improved sealing of the opening. In other embodiments, the remodelable material is present on the surface of the elongated member or is incorporated into the structure of the elongated member.

The remodelable material can be, for example, extra cellular material (ECM), small intestine submucosa (SIS), remodelable or collagenous foam, foamed ECM, lyophilized SIS or vacuum pressed SIS. One non-limiting example of a suitable remodelable material is the SURGISIS™. BIODESIGN™, commercially available from Cook Incorporated, Bloomington, Ind. Another suitable remodelable material is the graft prosthesis material described in U.S. Pat. No. 6,206,931, incorporated herein by reference.

When the catheter 10 is implanted inside a patient, the portion of the catheter 10 from proximal end 14 close to the cuff 15 is external to the patient, and can be considered an external patient portion. The remainder of the catheter 10 is implanted inside of the patient and can be considered an implantable portion. As shown in FIGS. 1A and 1B, the implantable portion may have a generally non-linear shape, although portions of the implantable portion may be substantially linear. Because the tubing is flexible, it may adopt configurations to fit within the peritoneal cavity.

In embodiments, a radiopaque stripe may extend along the length of the catheter 10. Under x-ray, the radiopaque stripe shows the position of the catheter 10 inside the patient.

The distal region 13 comprises a plurality of perforations or holes 17 in fluid communication with the first lumen, and an expandable member or expandable structure. The number and size of the perforations 17 are not limited, but they may be configured to allow extracellular fluid but not cellular matter to pass into the first lumen.

In embodiments, the expandable member comprises an expandable structure such as a balloon. Accordingly, the device also includes at least one inflation tube in a second lumen (not illustrated) to provide for inflation of the expandable structure. The inflation tube will typically extend from the proximal region 12 of the device to the expandable structure and be in fluid contact with the interior of the expandable structure. For example, elongated tubular member 11 may have at least two lumens; a first, larger lumen for dialysis fluid to pass through and a second, smaller lumen that provide for inflation of the expandable structures. As described above, the expandable structure may comprise a balloon or an open cell foam structure.

In the embodiment shown in FIGS. 1A and 1B, the plurality of perforations is disposed at the distalmost end of the distal region 13 and the expandable member is disposed proximally of the plurality of perforations.

In FIG. 1A, the expandable structure is shown in a deflated or compressed configuration 18a and is disposed proximally from the plurality of perforations 17. A retractable sheath (not shown) around the expandable structure 18a may be used to protect the deflated expandable structure during insertion of the catheter into the abdomen of a patient. FIG. 1B shows the expandable structure in an expanded configuration 18b. After inflation, the expandable structure functions as a float to hold the distal region 13 of the catheter 10 near the upper level of the fluid within the patient's abdomen, so that the catheter does not sink down and be blocked by the patient's bowel. The expandable structure may also hold the distal portion of the sheath away from the surface of the bowel to further reduce the possibility of the bowel blocking the perforated region.

In embodiments, the expandable structure is disposed longitudinally along a length of the distal region 13.

The expandable structure of the device may be manufactured from any materials typically used for the manufacture of expandable structures. For example, the expandable structures may include materials such as a nylon, polyamide, polyolefin, polyester, polyurethane, fluoropolymer, polyethylene, polytetrafluoroethylene (PTFE), polyethyleneterephthalate (PET), polyvinyl chloride, latex, natural rubber, synthetic rubber, elastomer, silicone or mixtures and copolymers or two or more of these materials.

Foam is a material formed by trapping pockets of gas in a liquid or solid. During open cell foam expansion and curing, the gas bubbles used in its production are released into the atmosphere as against being locked in place as with closed cell foams. Open cell foams are those wherein the cells within the material have been broken, allowing air to occupy the spaces within. Open cell foams contain pores that are connected to each other and form an interconnected network that is relatively soft, with a sponge-like appearance. Usually open cell foams are lightweight and less dense compared to closed cell foams and are more expandable than closed-cell foams. There are an array of open cell foam materials, but generally they are made of polyurethane, reticulated polyurethane, PVC/Nitrile, ethylene propylene diene monomer (EPDM) rubber etc. A notable material is medical grade silicone open cell foam.

As shown in FIGS. 1A and 1B, the distal region 13 of the catheter may be curved, such as in the shape of a spiral or "pig-tail" to provide for stabilization of the catheter. In such curved embodiments, the curvature can be the result of shape memory configured in the catheter during manufacture. During insertion, the curved portion can be "straightened" by passing the catheter over a straight stylet. When the straight stylet is removed or retracted from the catheter 10 after insertion, the distal region 13 can resume its curved configuration. Alternatively, a retractable sheath may hold the catheter in a straightened configuration for insertion.

FIGS. 2A through 6B show aspects of other embodiments of the catheter 10 shown herein. In these embodiments, the elongate tubular member 11 and proximal region 12 are substantially similar to those shown in FIGS. 1A and 1B, so for simplicity of presentation, they are not shown in FIGS. 2A through 6B.

Figure 2A:
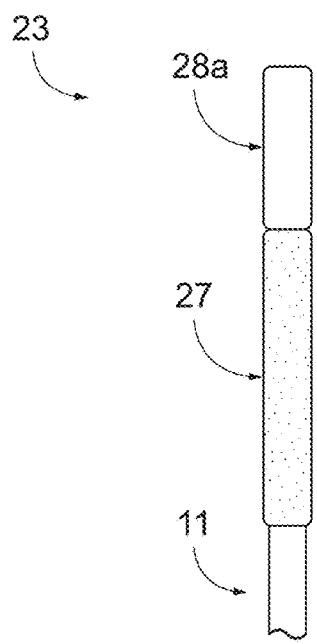
FIGS. 2A and 2B depict schematic illustrations of another embodiment of a catheter according to an exemplary embodiment of the disclosed subject matter.
Figure 2B:
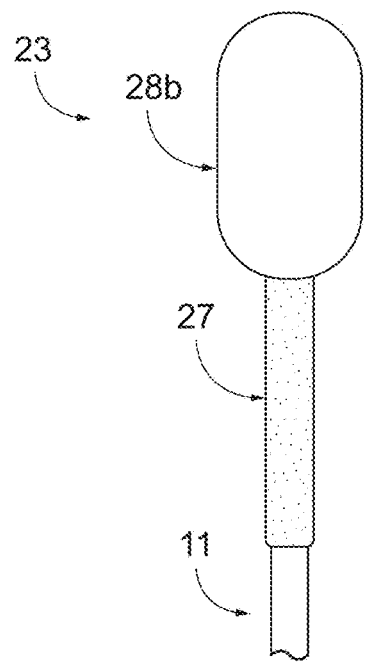

In the embodiment shown in FIGS. 2A and 2B, the distal region 23 comprises an expandable structure disposed at the distalmost end of the distal region 23 and a plurality of perforations 27 disposed proximally of the expandable structure and adjacent to an unperforated region of the elongate tubular member 11. In FIG. 2A, the expandable structure 28a is in a deflated or compressed configuration. In FIG. 2A, the expandable structure 28b is in an inflated or expanded configuration.

Figure 3A:
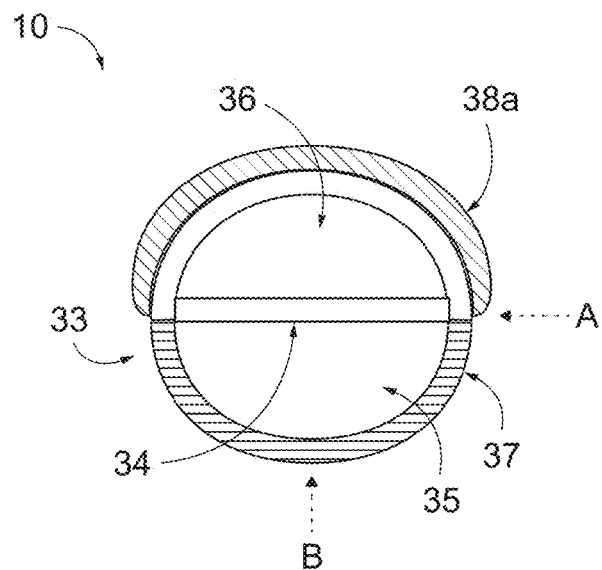
FIGS. 3A and 3B depict schematic cross-section illustrations of another embodiment of a catheter according to an exemplary embodiment of the disclosed subject matter.
Figure 3B:
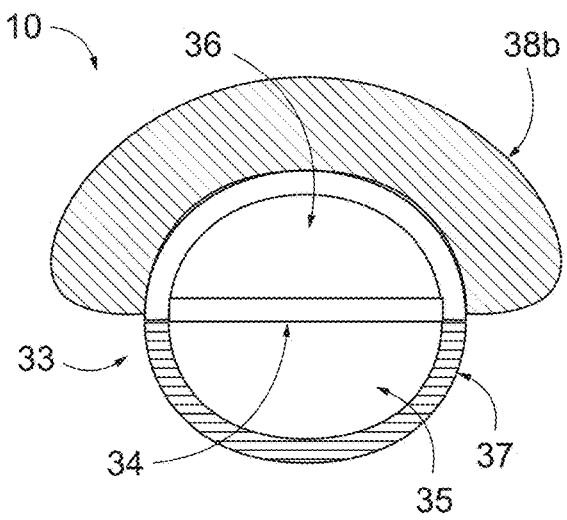

In other embodiments, the expandable structure and the perforations occupy separate sections substantially along the same length of the distal region, wherein the expandable structure is disposed at a first portion of the circumference of the distal region and the plurality of perforations is disposed at a second portion of the circumference of the distal region. In these embodiments, the expandable structure may be disposed along the entire length of the perforated portion of the distal region of the PDC. A schematic cross-section of the catheter 10 according to these embodiments is shown in FIGS. 3A and 3B. In FIG. 3A, the distal region 33 comprises a septum 34 that divides the tubular member 11 into a first lumen 35 and a second lumen 36 that each extend the length of the catheter 10 from the proximal region 12 to the distal region 33. First lumen 35 is in fluid communication with a perforated region 37 that comprises a plurality of perforations analogous to perforations 17 as shown in FIG. 1A. Second lumen 36 is in fluid communication with an expandable structure, shown in deflated configuration 38a in FIG. 3A. When gas is passed through the second lumen 36, the expandable structure is inflated, shown in inflated configuration 38b in FIG. 3B.

FIGS. 4A and 4B show side views of the distal region 33 shown in FIGS. 3A and 3B, viewed along line A shown in FIG. 3A. In these views, the distal region 33 comprises a simple "straight" configuration, but as noted, the catheter is flexible such that the straight configuration may actually bend and curve as it is deployed in a patient. The perforated region 37 occupies a first circumferential portion of the distal region 33 and the expandable structure occupies a second circumferential portion of the distal region 33, in deflated configuration 38a in FIG. 4A and in inflated configuration 38b in FIG. 4B.

Figure 5C:
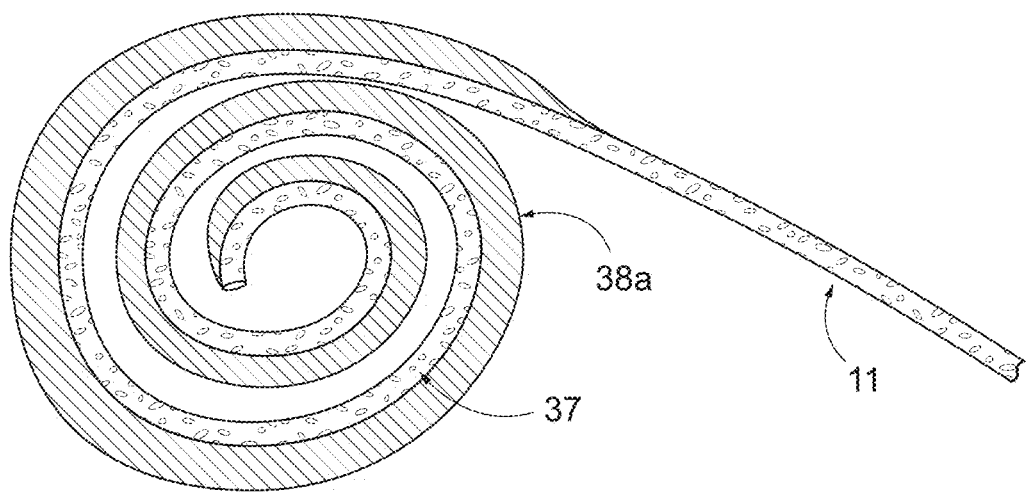

FIGS. 5A through 5C depict schematic illustrations of curved embodiments of a catheter viewed along line A shown in FIG. 3A. In FIG. 5A, the distal region 33 comprises a curved configuration in which the perforated portion 37 of the distal region 33 occupies the inner (smaller) radius of the curved configuration and the deflated expandable structure 38a occupies the outer (larger) radius of the curved configuration. FIG. 5B shows the same catheter wherein the expandable structure is in its inflated state 38b. FIG. 5C shows a spiraled configuration of distal region 33 in which the expandable structure is shown in an inflated state. As described above, the curvature illustrated in FIGS. 5A through 5C is not limited, and because the catheter comprises a flexible material, the curvature is not fixed and can be straightened for insertion into the patient and then reformed after insertion.

In other embodiments, not illustrated, the expandable structure may occupy the inner radius of a curved distal region.

Figure 6A:
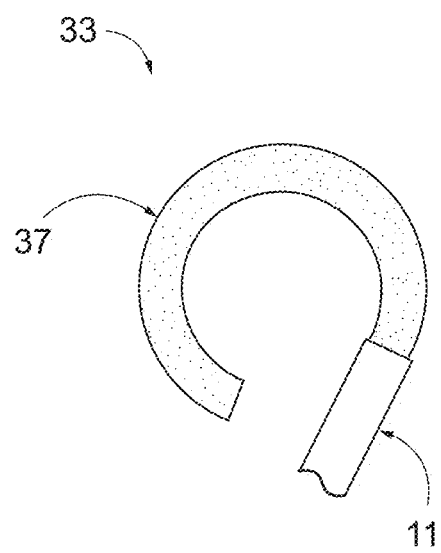
FIGS. 6A and 6B depict schematic illustrations of another curved embodiment of a catheter according to an exemplary embodiment of the disclosed subject matter.
Figure 6B:
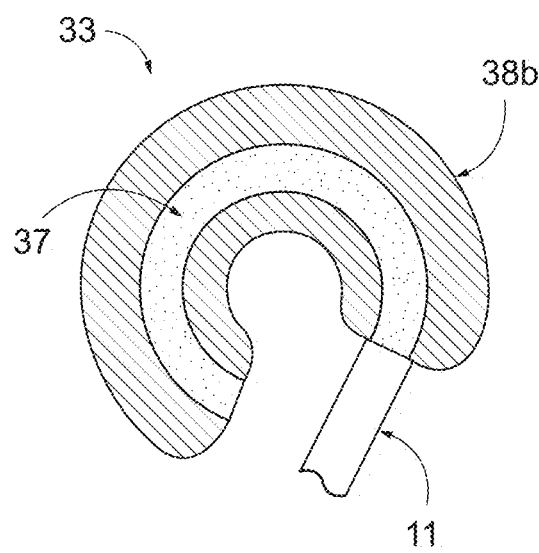

FIGS. 6A and 6B show another embodiment of a curved distal region. In this embodiment, the distal region comprises a cross-section according to the cross-sections shown in FIGS. 3A and 3B, viewed along line B of FIG. 3A. In this embodiment, the expandable structure occupies the "top" of the catheter in relation to the axis of the curve of the catheter and the perforated region occupies the "bottom" of the catheter in relation to the axis of the curve of the catheter. In FIG. 6A, the catheter is viewed from the bottom along line B, which is parallel to the axis of curvature. The expandable structure in FIG. 6A is in a deflated state, so it cannot be seen behind the perforated portion 37. In FIG. 6B, the expandable structure is in its inflated state 38b, and is visible behind the perforated portion 37.

Figure 7A:
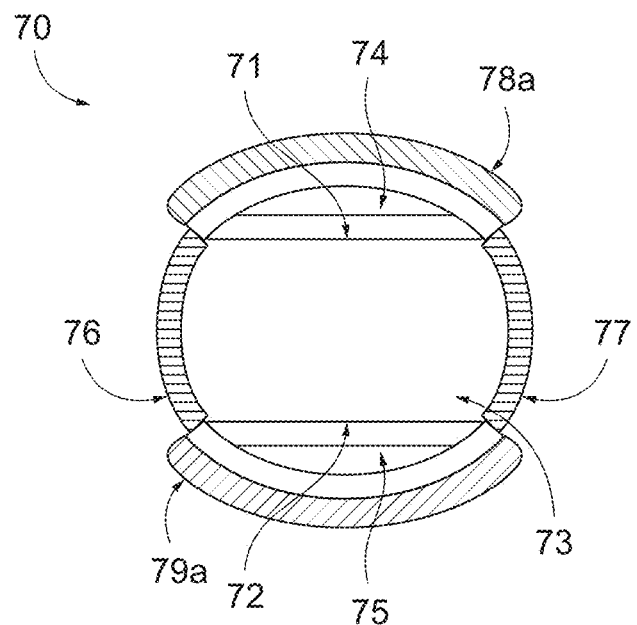
FIGS. 7A and 7B depict schematic cross-section illustrations of another embodiment of a catheter according to an exemplary embodiment of the disclosed subject matter.
Figure 7B:
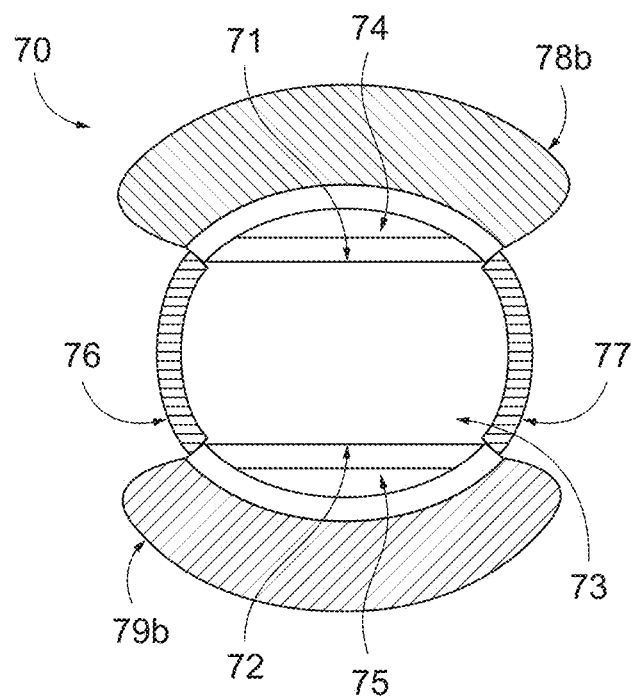

FIGS. 7A and 7B depict schematic cross-section illustrations of another embodiment of a catheter comprising two expandable structures disposed diametrically opposed on a distal region of a PDC. The catheter comprises a tubular member 70 comprising two septa 71 and 72 that divide the tubular member 70 into a larger (first) lumen 73 and two smaller lumens 74 and 75. Lumen 73 is in fluid communication with two perforated portions 76 and 77 diametrically opposed on the tubular member 70. The lumen 73 extends the length of the tubular member and is configured to convey dialysate fluid between the proximal region 12 of the catheter and the distal portion shown. Lumens 64 and 75 also extend the length of the tubular member and are configured to convey inflation gas from the proximal region 12 of the catheter to the expandable structures. In FIG. 7A, the expandable structures are shown in their deflated or compressed states 78a and 79a. In FIG. 7B, the expandable structures are shown in their inflated or expanded states 78b and 79b.

Figure 8A:
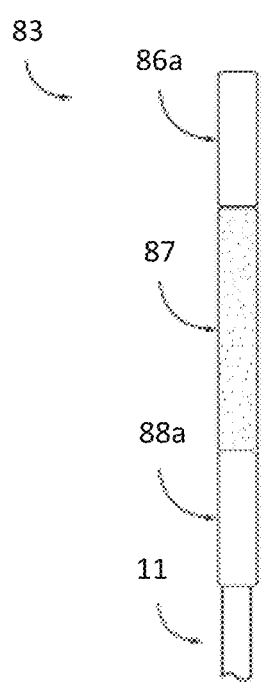
FIGS. 8A and 8B depict an alternate embodiment of a catheter comprising two expandable structures on a distal region of a PDC according to an exemplary embodiment of the disclosed subject matter.
Figure 8B:
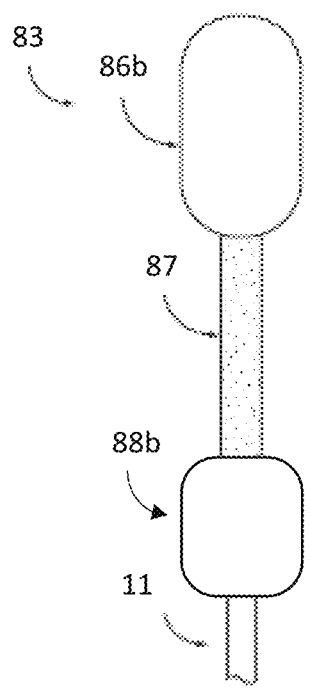

FIGS. 8A and 8B depict an alternate embodiment of a catheter comprising two expandable structures on a distal region of a PDC. In this embodiment, shown in FIG. 8A, a PDC comprises a distal region 83 with a first expandable structure 86a in a compressed state positioned distally relative to a perforated region 87 and a second expandable structure 88a in a compressed state positioned proximally relative to a perforated region 87. FIG. 8B shows the same distal region 83 with the expandable structures in their expanded states 86b and 88b, resulting in a "barbell" configuration.

Although two expandable structures are shown in FIGS. 7A, 7B, 8A and 8B, this is not limiting. In embodiments, the PDC may comprise a plurality of expandable structures.

Figure 9A:
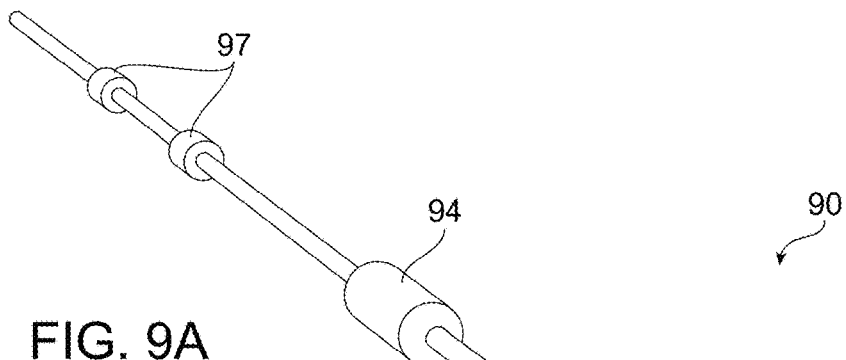
FIGS. 9A, 9B and 9C depict another embodiment of a catheter according to an exemplary embodiment of the disclosed subject matter.
Figure 9B:
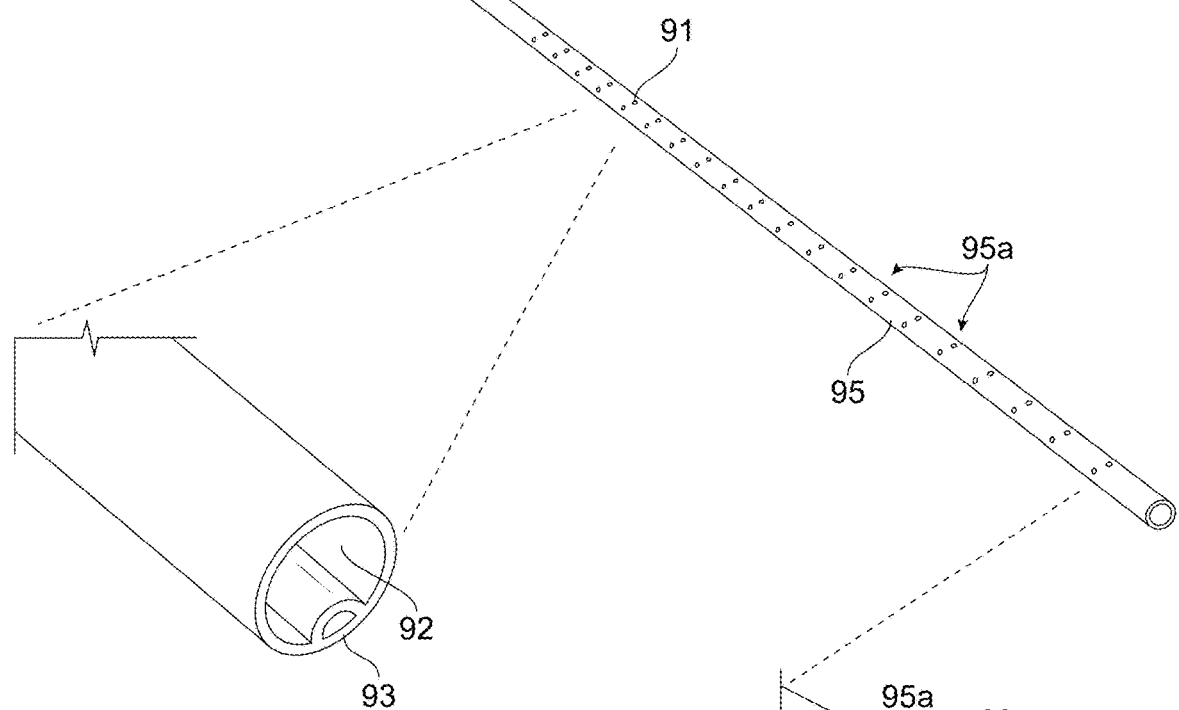
Figure 9C:
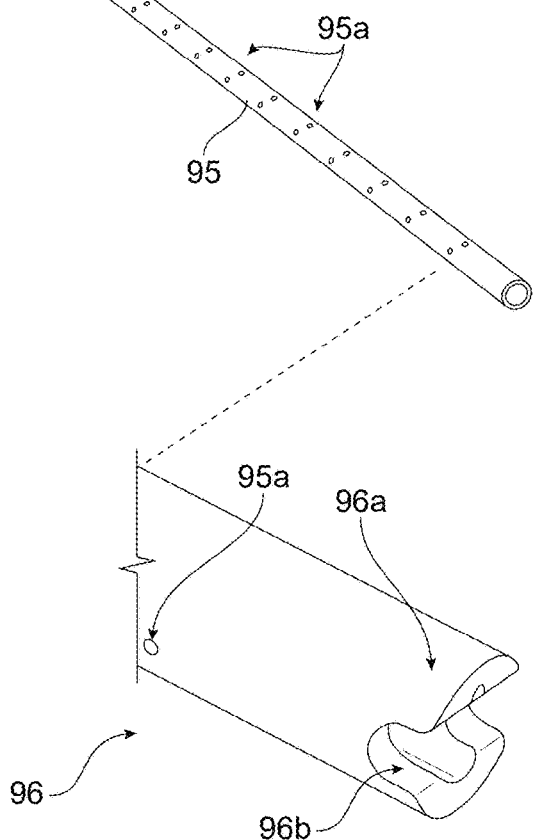

FIGS. 9A, 9B and 9C illustrate aspects of an embodiment of a peritoneal dialysis catheter, shown with its distal end extended linearly. An embodiment of the catheter 90 comprises two main features. First, as shown in detail FIG. 9B, it comprises a dual-lumen silicone tube 91, with one lumen 92 for infusion and drainage of dialysate fluid and another lumen 93 to convey vacuum or air to collapse or expand a silicone balloon or sheath with a foam insert. Second, it comprises a silicone balloon or sheath 94 with compressible foam insert (not shown) attached near the distal end of the catheter, which would rest inside the peritoneal cavity after insertion. The foam insert inside the balloon will expand with air to provide buoyancy during dialysis and improve drainage of dialysate. The distal end 95 of the catheter comprises a laser ablated baffle with perforations in the fluid lumen comprising a plurality of laser-ablated holes disposed along the perforated region of the catheter. The perforations provide fluid communication from the peritoneal cavity into the fluid lumen 92 of the catheter. The distal end 95 is shown in an extended linear configuration, such as for insertion into a subject's peritoneal cavity, but the distal end 95 can adopt a curved or spiral configuration after insertion as described previously.

In embodiments, the distal tip 96 of the catheter is configured to minimize contact of the distal, working end of the catheter with the surface of the bowel, bladder or peritoneum. As shown in detail FIG. 9C, the distal end comprises a crenelated tip 96 with a plurality of alternating longitudinal projections or peaks 96a and longitudinal depressions or valleys 96b. In the embodiment shown, the tip comprises two diametrically disposed projections or peaks and two diametrically disposed depressions or valleys, but this is not limiting.

Also shown in FIG. 9A, the catheter comprises one or more ingrowth cuffs 97 near the proximal end of the catheter to provide substrate(s) for tissue ingrowth to facilitate anchoring the proximal end of the catheter 90 near the peritoneal wall of the subject. The cuffs can be prepared from polyethylene terephthalate (DACRON) fibers and are disposed around the circumference of the catheter.

The silicone balloon or sheath 94 with compressible foam insert may be placed into the peritoneal cavity through a peel away or retractable sleeve. Initially the balloon is collapsed for insertion in the abdomen. During implantation, the system is kept under vacuum to keep the buoyancy balloon compressed. Exposure to atmospheric air through lumen 93 expands the balloon. Once negative pressure is removed, air can enter the foam insert and expand the balloon.

Figure 10A:
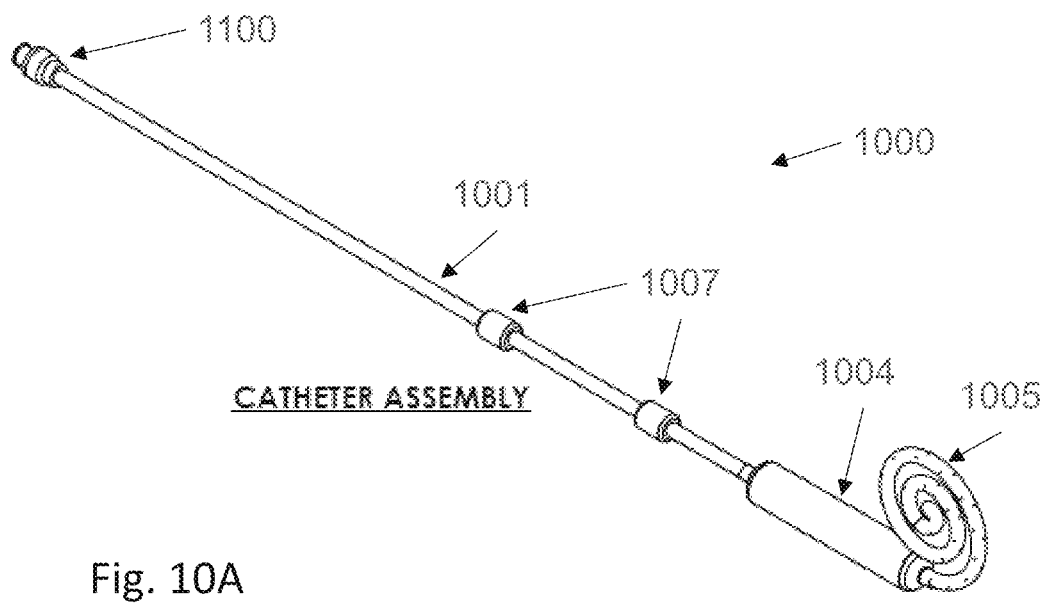
FIGS. 10A through 10R depict another embodiment of a catheter according to an exemplary embodiment of the disclosed subject matter.
Figure 10B:
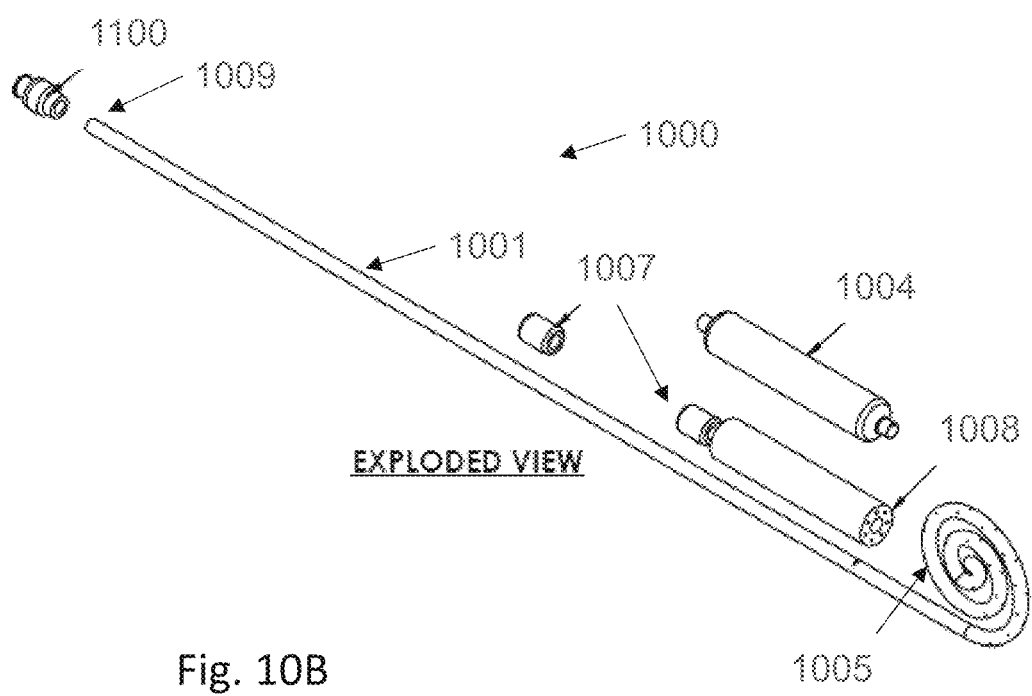
Figure 10I:
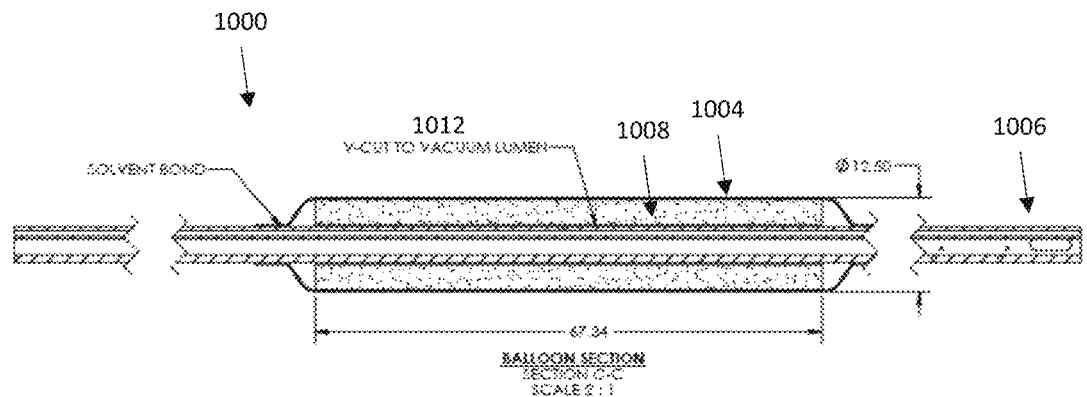
Figure 10J:
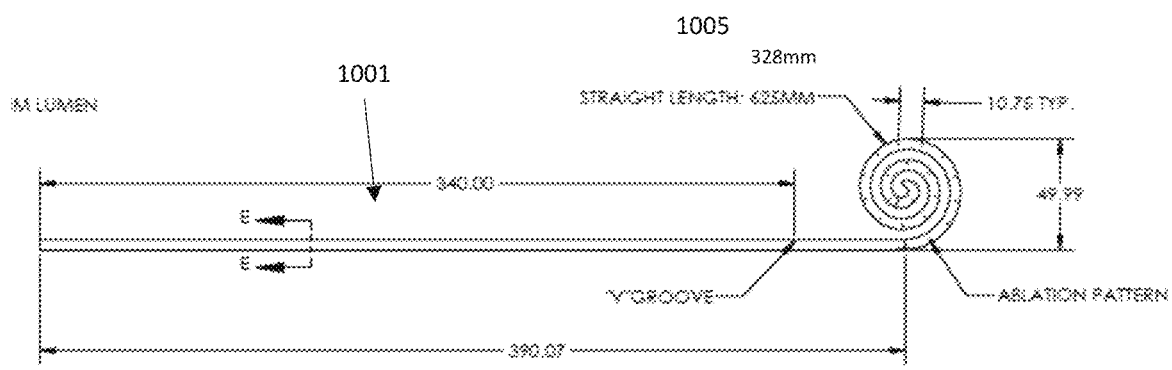
Figure 10K:
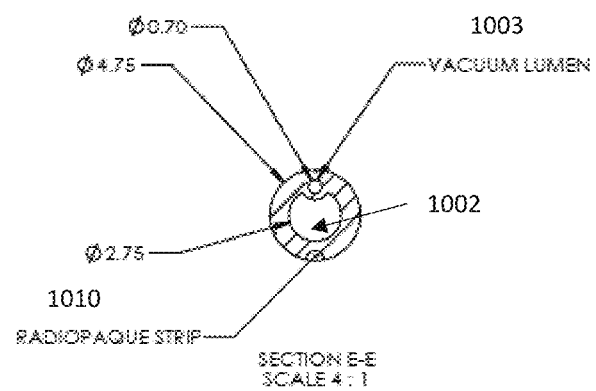
Figure 10P:
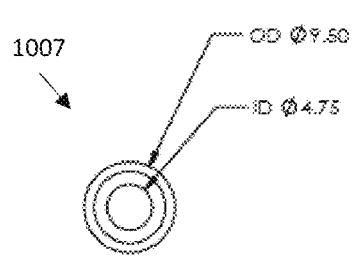
Figure 10Q:
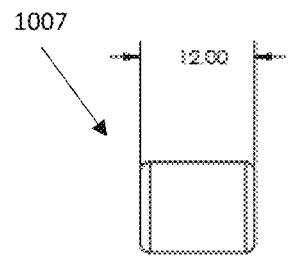
Figure 10R:
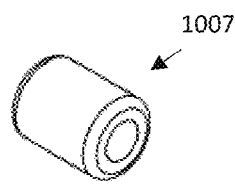

Another embodiment of the catheter is shown in FIGS. 10A through 10R. FIGS. 10A and 10B show the catheter 1000 in assembled and exploded views. It comprises a dual-lumen catheter body 1001 with a silicone balloon or sheath 1004 disposed near the distal end 1005. Inside the balloon 1004 is a foam insert 1008. Two ingrowth cuffs 1007 are disposed around the catheter body. Disposed at the proximal end of the catheter is a vacuum adapter 1100 configured to engage the proximal end 1009 of catheter body 1001 and provide coupling to fluid handling systems to move dialysate in and out of the peritoneal cavity. FIG. 10C shoes an uncoiled view of the catheter 1000, with representative dimensions of the components indicated. In the embodiments shown, the overall uncoiled length of the catheter is 625 mm, the catheter outer diameter is 4.75 mm, with a wall thickness of 1.0 mm. Factoring in the air lumen, this results in a cross-sectional area of 5.4 mm for fluid to pass through. The silicone balloon 1004 in its expanded or non-compressed state has an outer diameter of 12.5 mm. During implantation, the system is kept under vacuum to keep the buoyancy balloon compressed. As shown in FIG. 10D, when vacuum is applied to the proximal end of the air lumen for insertion into the subject's peritoneal cavity, the outer diameter of the balloon 1004 is compressed to about 8 mm. The distal end 1005 of the catheter is disposed in an uncoiled state, held within a removable sleeve, for insertion. FIG. 10E shows the catheter after it has been deployed in the peritoneal cavity. The balloon expands once negative pressure is removed and air can enter the foam insert. The distal end 1005 is shown in its coiled state.

FIG. 10F shows that the catheter comprises an extrusion with a cross-section of the catheter at A-A shown in FIG. 10E. The cross-section shows the fluid lumen 1002 and vacuum/air lumen 1003. A radiopaque stripe 1010 coextruded with the dual lumen is also shown. FIG. 10G shows a cross-section of the catheter at B-B shown in FIG. 10E, with the foam insert 1008 expanded. The foam comprises an open cell foam. A plurality of larger diameter pores or holes disposed around the catheter provides open spaces that can collapse when vacuum is applied via lumen 1003 or expanded when air is applied via lumen 1003. Not shown, the lumen 1003 is perforated in the region of the catheter in contact with the foam insert 1008 to provide fluid (air) communication between the lumen 1003 and foam 1008.

In embodiments, the tip of the catheter is configured to minimize contact of the distal, working end of the catheter with the surface of the bowel, bladder or peritoneum. In this embodiment, the tip comprises an end opening and a plurality of openings disposed around the circumference of the catheter. As shown in FIG. 10H, the distal tip 1006 comprises two elongated openings 1006*a* diametrically disposed on opposite sides of the tip and an end opening 1006*b*, but this is not limiting. The distal end 1005 comprises a plurality of laser-ablated holes 1005*a* disposed along its length.

FIG. 10I shows a cut-away side view of the catheter 1000 in the balloon section along line C-C shown in FIG. 10C. Foam 1008 is disposed around catheter 1001 and inside balloon 1004. Balloon 1004 is attached to the outside of the catheter using a solvent bond or adhesive. A V-cut 1012 into the vacuum lumen 1003 provides fluid communication from the lumen 1003 to the foam 1008. Also shown is the distal tip 1006.

FIG. 10J shows the catheter lumen 1001 without the other components of the catheter. The distal end has a length of about 330 mm and is shown in a spiral coil having an outer diameter of about 50 mm. The distal end comprises a plurality of laser-ablated holes spaced at about 10 mm apart. FIG. 10K shows a cross-section of the lumen at line E-E of FIG. 10J. FIG. 10L shows side and perspective views of the balloon 1004. FIG. 10M shows side and perspective views of the foam insert 1008. The foam 1008 may be assembled from a plurality of shorter side-by-side segments configured around the catheter. This allows for preparation of catheters with different lengths of expandable structures. FIG. 10N shows a front view of the balloon 1004 and FIG. 10O shows a front view of the foam insert 1008. FIGS. 10P, 10Q and 10R show front, side and perspective views respectively of the ingrowth cuffs 1007.

Figure 11A:
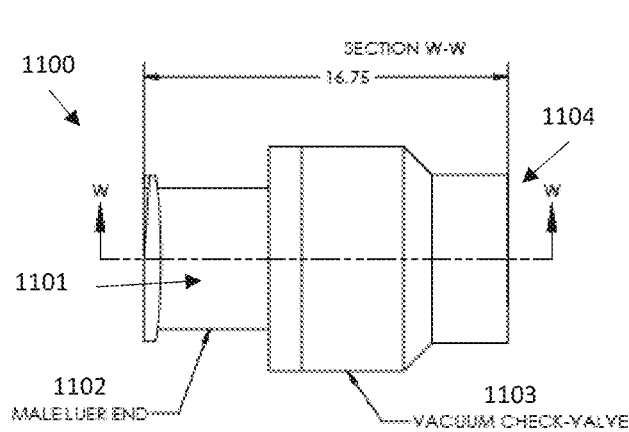
FIGS. 11A through 11F depict another embodiment of a catheter according to an exemplary embodiment of the disclosed subject matter.
Figure 11B:
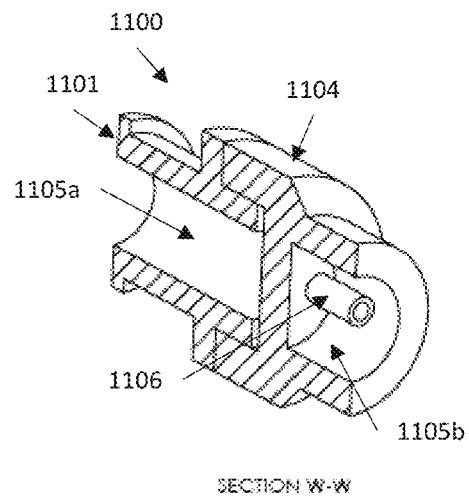
Figure 11C:
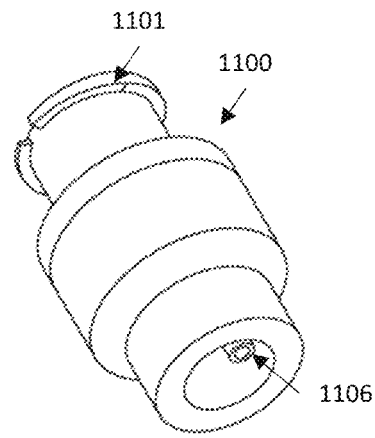
Figure 11D:
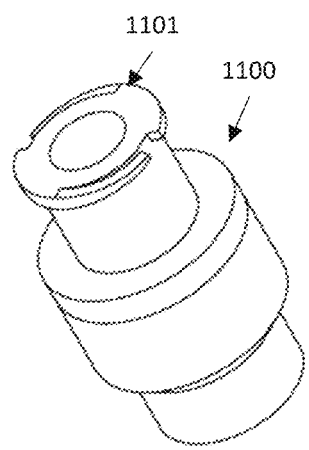
Figure 11E:
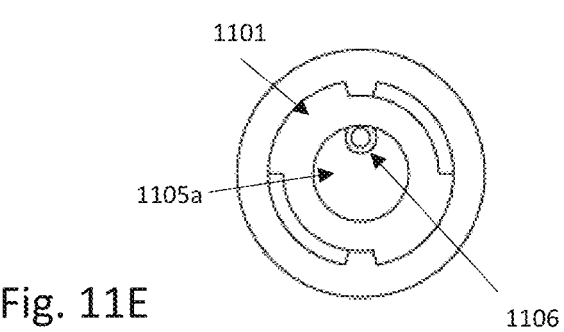
Figure 11F:
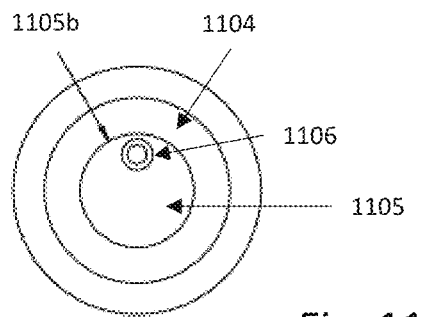

FIGS. 11A through 11F show aspects of a vacuum adapter 1100 configured to be engaged with the proximal end of the catheter to provide fluid communication from the subject's peritoneal cavity via the catheter 1000 to other fluid handling structures outside the subject's peritoneum. FIG. 11A shows a side view of the vacuum adapter 1100. It comprises a male Luer fitting 1102 on its proximal end 1101 for attachment of a syringe or other fluid handling system. The central section 1103 of the adapter comprises a vacuum check valve. The distal end 1104 of the adapter 1100 is configured to engage the proximal end of the dual-lumen catheter 1000. FIG. 11B shows a cutaway view of the adapter 1100 along line W-W of FIG. 11A. As shown in FIG. 11B, the proximal end 1101 and distal end 1104 are configured to engage each other to define a fluid passage 1005 that allows dialysate fluid to pass through. They are engaged to provide a vacuum check valve 1103. The diameter of passage 1105*a* of proximal end 1101 is sized to engage to external tubing, which may be configured to lock onto the male Luer fitting 1102 with a female Luer fitting. The diameter of passage 1105*b* of distal end 1104 is sized to engage to outer diameter of catheter 1000. A small passage 1006 is configured to insert into lumen 1003 of catheter 1000 to communicate air or vacuum into the lumen 1003 from outside the catheter. FIGS. 11C and 11D show perspective views of the vacuum adapter 1100. FIG. 11E shows a view of the proximal end of adapter 1100. FIG. 11F shows a view of the distal end of adapter 1100.

Figure 12A:
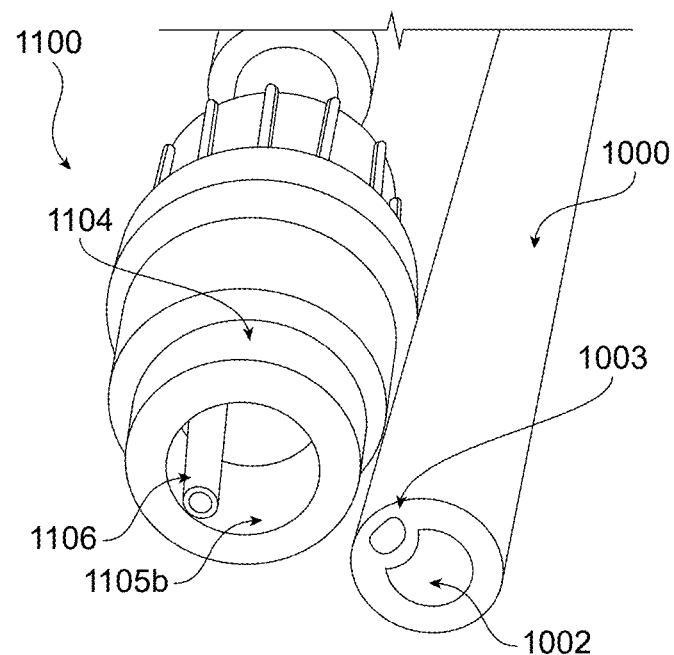
FIGS. 12A through 12D depict an embodiment of a catheter according to an exemplary embodiment of the disclosed subject matter.

FIGS. 12A through 12D show photographs of aspects of the catheter 1000 and adapter 1100. FIG. 12A shows the proximal end of catheter 1000 and the distal end of vacuum adapter 1100 side by side. It can be seen that the air passage 1105*b* is sized to engage the outside diameter of catheter 1000 so that it can be in fluid communication with fluid lumen 1002. It can also be seen that the air passage 1106 is sized to be inserted into lumen 1003.

Figure 12B:
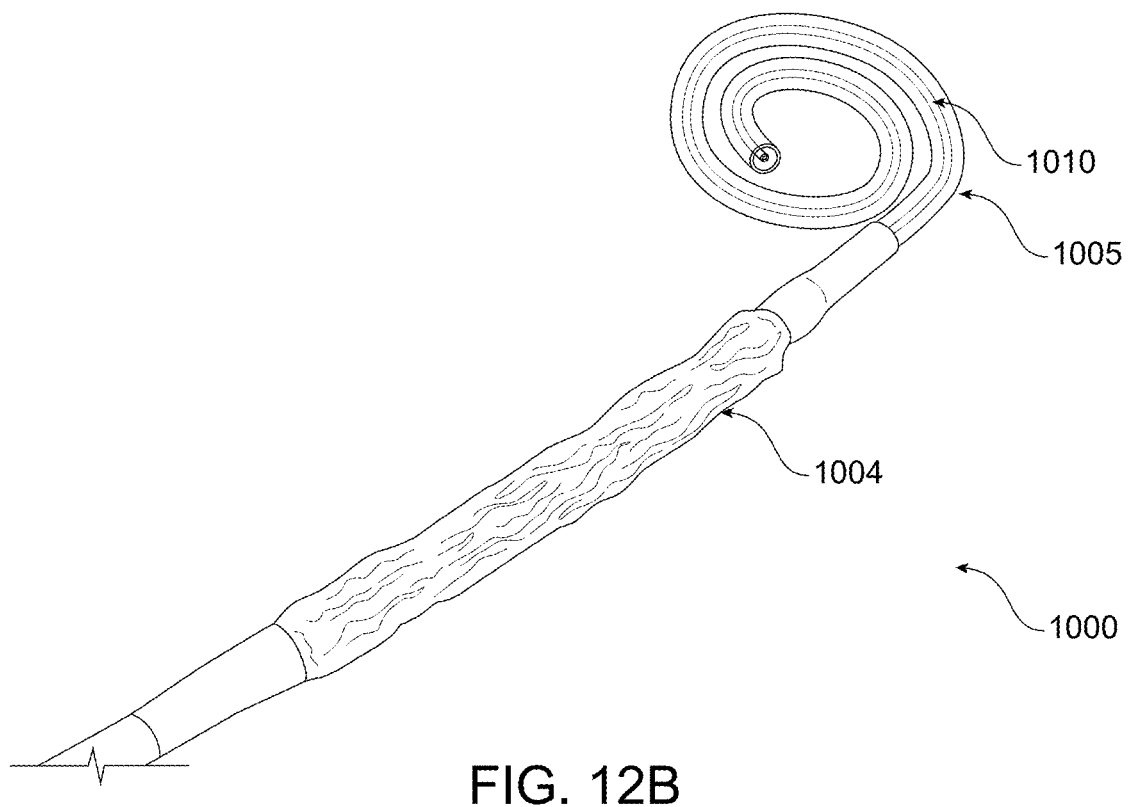
Figure 12C:
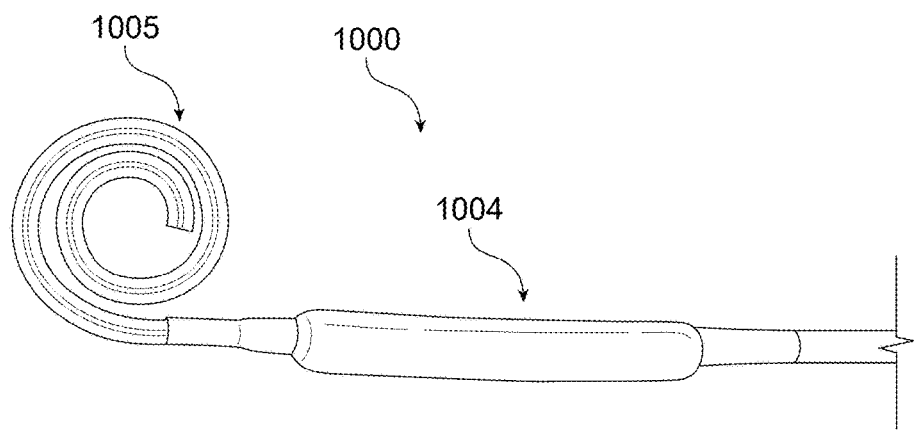
Figure 12D:
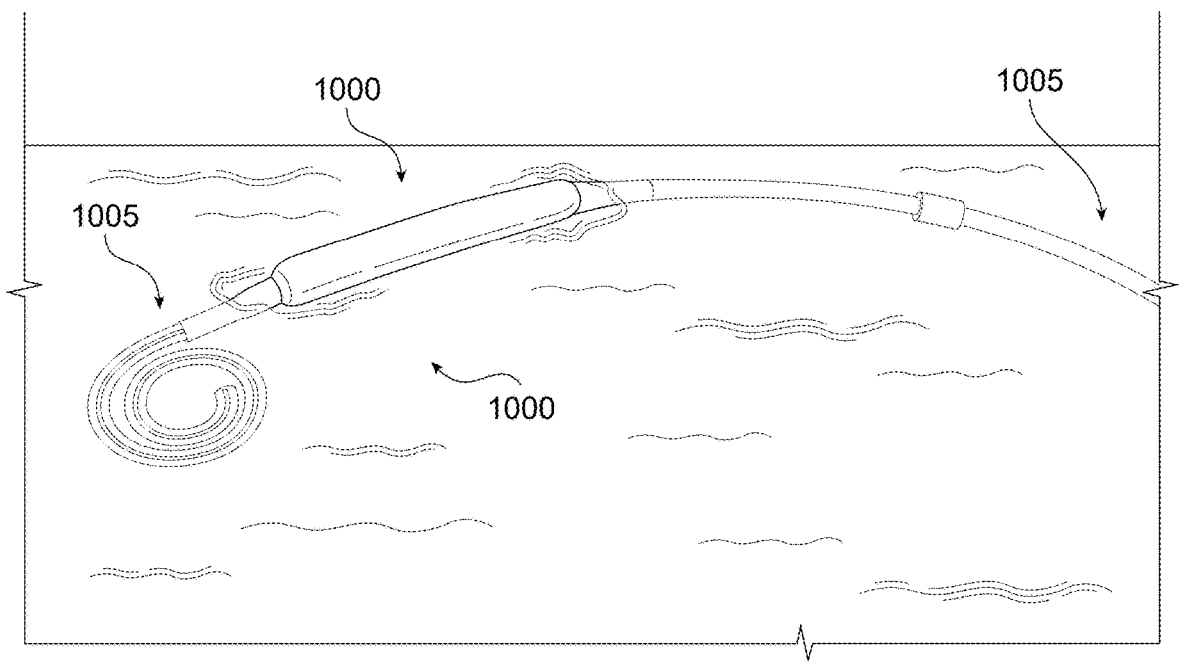

FIG. 12B shows the distal end 1005 and balloon 1004 of catheter 1000 with the balloon 1004 compressed. It can be seen that the skin of balloon 1004 is wrinkled or puckered, indicating it is not expanded. Radiopaque stripe 1010 is also shown, extending the length of the distal end 1005. FIG. 12C shows the distal end 1005 and balloon 1004 of catheter 1000 with the balloon 1004 expanded. It can be seen that the skin of balloon 1004 is smoother than in FIG. 12B, indicating the foam insert inside the balloon has expanded and inflated the balloon 1004. FIG. 12D shows the catheter 1000 in a pool of water. It can be seen that the expanded balloon 1004 is floating on the surface of the water, while the distal end 1005 and proximal end 1009 are submerged. This demonstrates that the expandable structure (e.g. balloon 1004) provides enough floatation to orient the catheter 1000 so that the distal end can be disposed near the upper levels of fluid inside a subject's peritoneal cavity.

The expandable structure can be inflated by physicians following standard laparoscopic, open, or percutaneous implantation of the catheter system. Peritoneal dialysis can be performed by healthcare providers and/or patients through standard techniques. Dialysate will be infused into the peritoneal cavity by connecting a dialysate bag to the catheter. The device will achieve the current standard flow rate of 6 L/hr. This catheter system can be used for APD or CAPD. The balloon will maintain inflation due to expanding open/closed cell foam insert (scaffold). In embodiments, the catheters are made of translucent silicone rubber tubing containing a radiopaque stripe, with felt cuffs available to provide catheter stabilization by virtue of tissue ingrowth.

Also provided is a kit comprising the catheter described herein; and a transfer fitting or vacuum adapter as described herein; optionally further comprising a stylet to guide insertion of the catheter into a subject peritoneal cavity; optionally further comprising a cutting tool, such as a scalpel, to create an opening into the peritoneal cavity to insert the catheter. The kit may further comprise instructions for use of the catheter.

Figure 13:
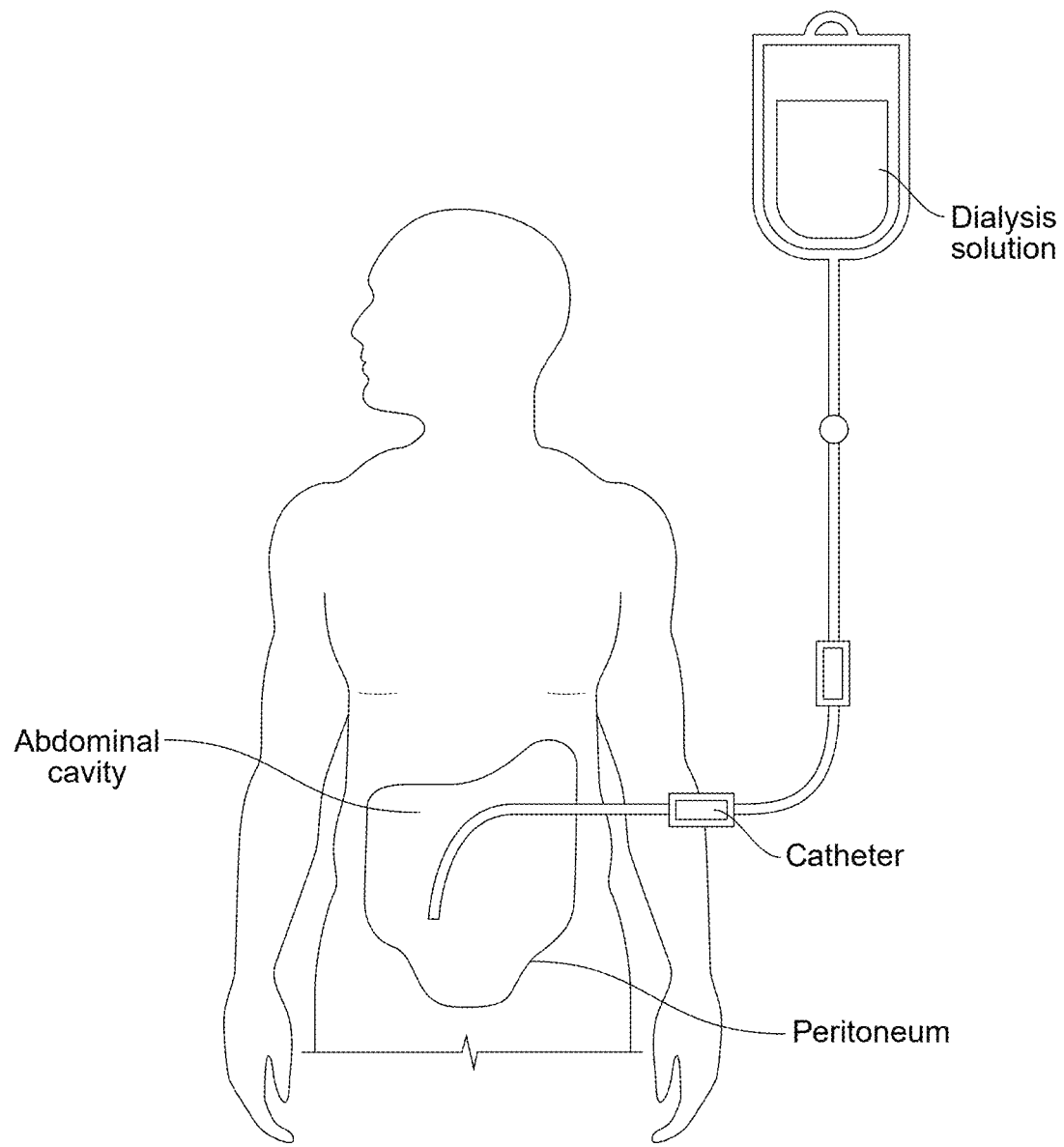
FIG. 13 depicts a schematic illustration of a PDC according to an exemplary embodiment of the disclosed subject matter inserted into the peritoneal cavity of a patient for peritoneal dialysis.

Another aspect of the present invention provides a method for performing peritoneal dialysis. As shown generally in FIG. 13, the distal end of a catheter device as disclosed above is inserted through an opening in a wall of the abdominal wall of a patient requiring dialysis. During this stage of the procedure, the expandable member comprising the expandable structure will typically be in a deflated or compressed configuration. For example, the expandable structure may be confined within the lumen of a delivery sheath.

In use, initially, the distal end of the device is inserted through an opening in the abdominal cavity wall such that distal region comprising the expandable structure and the plurality of perforations is positioned within the abdominal cavity. The expandable structure will normally be in a deflated or compressed state during this stage of the procedure. In embodiments, the expandable structure is compressed by application of a vacuum through the air lumen. After insertion of the elongate member to a desired length, the expandable structure can be inflated. For example, the expandable structure may be inflated through the inflation tube(s) with a gas such as air or helium.

The dialysate fluid is delivered from the proximal end 12 of elongated member 11 to the distal end of the device and then into the abdominal cavity via the first lumen. Hence, first lumen provides a leak-free pathway from the exterior into the abdomen of the patient.

In embodiments wherein the distal region of catheter comprises a curved portion, the catheter is passed over a straight stylet into the abdomen and as the stylet is removed the catheter curls or curves.

The expandable structure can be subsequently expanded by inflation by a gas transported from the proximal region in the device to the expandable structure via an inflation tube in the second lumen. Gas for inflation of the expandable structure can be supplied from the automated peritoneal dialysis system or from a separate device connected to the second lumen at the proximal region of the catheter, usually a syringe. In an embodiment, the expandable structure can be inflated after insertion and before introduction of dialysate fluid into the abdomen. Alternatively, the expandable structure can be inflated after introduction of dialysate. The expandable structure can be inflated before or after dialysate introduction to maximize emptying during the drainage period. Alternatively, the expandable structure can remain inflated for the lifespan of the indwelling PDC (up to years).

A volume of dialysate fluid is introduced into the abdomen through the first lumen of the elongated member. Typically, the volume of fluid introduced is from about 1 to 3 liters and the fluid is introduced over a period of about ten to fifteen minutes. The fluid remains in the abdominal cavity and waste products diffuse across the peritoneum from the underlying blood vessels and into the fluid in the peritoneal cavity. After a variable period of time depending on the treatment, typically up to 4-6 hours, the fluid is removed through the lumen of the device while the expandable structure is inflated. This air-filled expandable structure system is positioned adjacent to the perforated portion of the PDC in the distal region with the objective of keeping the PDC afloat on top of the dialysate. This would maximize the PDC's contact with the dialysate (away from the bowel) as the level is reduced with drainage. An expandable structure-PDC as described herein would float until the fluid is completely removed.

This process can occur automatically while the patient is sleeping (automated peritoneal dialysis), or during the day by keeping one to three liters of fluid in the abdomen at all times, exchanging the fluids four to six times per day (continuous ambulatory peritoneal dialysis).

Automated peritoneal dialysis is similar to continuous peritoneal dialysis in that the dialysis treatment includes at least one drain, fill, and dwell cycle. However, a dialysis machine automatically performs 1-5, such as 3-5 cycles of peritoneal dialysis treatment, typically overnight while the patient sleeps. It can be appreciated that the dwell time is variable depending on the number of cycles envisioned during the dialysis treatment. A dialysis machine is fluidly connected to the implanted catheter. The dialysis machine is also fluidly connected to a source of fresh dialysate, such as a bag of dialysate solution, and to a fluid drain. The dialysis machine pumps spent dialysate from the peritoneal cavity through the catheter to the drain. Then, the dialysis machine pumps fresh dialysate from the dialysate source through the catheter and into the patient's peritoneal cavity. The dialysis machine allows the dialysate to dwell within the cavity to transfer waste, toxins, and excess water from the patient's bloodstream to the dialysate solution. The dialysis machine is computer controlled so that the dialysis treatment occurs automatically when the patient is connected to the dialysis machine, for example, overnight. Several drain, fill, and dwell cycles will occur during the treatment. Also, a last fill is typically used at the end of the automated dialysis treatment so that the patient can disconnect from the dialysis machine and continue daily functions while dialysate remains in the peritoneal cavity. Automated peritoneal dialysis frees the patient from manually performing the drain, dwell, and fill steps, and can improve the patient's dialysis treatment and quality of life. Additional rounds of dialysis treatment using a PDC described herein may be conducted over an extended period of time.

The catheter may be used as a temporary measure to provide dialysis to maintain blood homeostasis, while waiting for another form of dialysis treatment to begin, to allow the kidneys to recover from trauma, or while waiting for hemodialysis access points to heal. In other embodiments, the catheter may be used permanently for peritoneal dialysis.

When the need for peritoneal dialysis is ended, such as when an alternative dialysis treatment is initiated or a kidney is transplanted into the subject, the expandable structure can be deflated and the catheter removed from the subject.

The fluid used typically contains sodium salts such as sodium chloride, sodium lactate or sodium bicarbonate and a high percentage of glucose to ensure hyperosmolarity. The amount of dialysis that occurs depends on the volume of the fluid, the regularity of the exchange and the concentration of the fluid. The presence of the catheter presents a risk of peritonitis due to the potential to introduce bacteria to the abdomen. Peritonitis may be treated through the direct infusion of antibiotics into the peritoneal cavity via the fluid.

Aspects of the disclosed subject matter include the following.

One aspect of the disclosed subject matter provides a device comprising: an elongate tubular member comprising a proximal region, a distal region, a first lumen extending from the proximal region to the distal region and comprising a wall that is free of an opening providing a fluid path between the first lumen and an exterior of the device; wherein the proximal region is configured to be engaged to a transfer fitting to control fluid flow through the first lumen; the distal region comprises a plurality of perforations in fluid communication with the first lumen and an expandable member comprising an expandable structure; and a second lumen comprising an inflation tube extending from the proximal region of the device to the expandable structure.

Embodiments of the device include the following, alone or in any combination.

The device wherein the plurality of perforations is disposed at the distalmost end of the distal region and the expandable structure is disposed proximally of the plurality of perforations.

The device wherein the distalmost end comprising the plurality of perforations is curved.

The device wherein the distalmost end comprising the plurality of perforations is configured as a spiral.

The device wherein the expandable structure is disposed at the distalmost end of the distal region and the perforations are disposed proximally of the expandable structure.

The device wherein the expandable structure is disposed longitudinally along a portion of the distal region.

The device wherein the expandable structure is disposed at a first portion of the circumference of the distal region and the plurality of perforations is disposed at a second portion of the circumference of the distal region.

The device wherein the distal region is curved.

The device wherein the distal region is configured as a spiral.

The device wherein the expandable structure comprises a material selected from the group consisting of a nylon, polyamide, polyolefin, polyester, polyurethane, fluoropolymer, polyethylene, polytetrafluoroethylene (PTFE), polyethyleneterephthalate (PET), polyvinyl chloride, latex, natural rubber, synthetic rubber, elastomer, silicone and mixtures and copolymers thereof.

The device further comprising a cuff positioned on the wall of the elongated tubular member at the proximal region.

The device further comprising a second cuff positioned on the wall of the elongated tubular member at the proximal region.

The device wherein the expandable structure comprises a balloon.

The device wherein the expandable structure comprises a sheath defining a cavity containing open cell foam therein.

The device further comprising a retractable non-expandable sheath disposed radially outside the expandable structure.

Another aspect is a method for performing peritoneal dialysis, comprising: inserting the distal region of the device described above through an opening in an abdominal wall of a subject in need of dialysis; introducing a fluid into the abdomen through the first lumen; maintaining the fluid in the abdomen for a time sufficient for waste products to diffuse into the fluid from blood vessels surrounding the abdomen; expanding the expandable structure; and removing the fluid from the abdomen through the first lumen.

The method further comprises the following embodiments alone, or in combination.

The method comprising contracting the expandable structure after the fluid is removed from the abdomen.

The method wherein the device further comprises a retractable sheath disposed around the expandable structure and the method further comprises retracting the retractable sheath prior to expanding the expandable structure.

Also provided is a method for treating a subject in need of peritoneal dialysis, comprising: inserting the distal region of the device described above through an opening in an abdominal wall of the subject; inflating the expandable structure through the second lumen; introducing a fluid into the abdomen through the first lumen; maintaining the fluid in the abdomen for a time sufficient for waste products to diffuse into the fluid from blood vessels surrounding the abdomen; and removing the fluid from the abdomen through the first lumen.

The method further comprises the following embodiments alone, or in combination.

The method comprising contracting the expandable structure after the fluid is removed from the abdomen.

The method wherein the device further comprises a retractable sheath disposed around the expandable structure and the method further comprises retracting the retractable sheath prior to expanding the expandable structure.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A method for performing peritoneal dialysis, comprising:
    inserting a distal region of a device through an opening in an abdominal wall into a peritoneal cavity of a subject in need of dialysis; wherein the device comprises
    an elongated tubular member comprising a proximal region, the distal region, and a wall extending from the proximal region to the distal region defining a first lumen comprising a fluid lumen and a second lumen comprising an inflation lumen, wherein a portion of the wall disposed at the distal region includes a plurality of perforations in fluid communication with the first lumen, and
    an expandable member comprising an elastomeric sheath with a compressible foam insert configured to function as a float to hold the distal region near an upper level of fluid within a patient's peritoneal cavity and disposed on the tubular member in fluid communication with the second lumen;
    expanding the expandable member through the second lumen, thereby causing the expandable member to function as a float to hold the distal region near an upper level of fluid within the subject's peritoneal cavity;
    introducing a fluid into the abdomen through the first lumen;
    maintaining the fluid in the abdomen for a time sufficient for waste products to diffuse into the fluid from blood vessels surrounding the abdomen; and
    removing the fluid from the abdomen through the first lumen.

2. The method of claim 1 further comprising deflating the expandable member after the fluid is removed from the abdomen and removing the device from the subject's peritoneal cavity.

3. The method of claim 1 wherein the device further comprises a retractable non-expandable sheath disposed radially outside the expandable member configured to prevent expansion of the expandable member and the method further comprises retracting the retractable sheath prior to expanding the expandable member.

4. The method of claim 1 wherein the portion of the wall comprising the plurality of perforations is disposed along the elongated tubular member distal to the expandable member.

5. The method of claim 1 wherein the expandable member is disposed longitudinally along a portion of the distal region.

6. The method of claim 1 wherein the expandable member is sized to encapsulate at least a portion of a circumference of at least a portion of the elongated tubular member.

7. The method of claim 1 wherein the expandable member fully encapsulates at least a portion of the elongated tubular member.

8. The method of claim 1 wherein the portion of the wall comprising the plurality of perforations has a curved configuration.

9. The method of claim 8 wherein the curved configuration has a spiral shape.

10. The method of claim 1, wherein the expandable member comprises a material selected from the group consisting of a nylon, polyamide, polyolefin, polyester, fluoropolymer, polyethylene, polytetrafluoroethylene (PTFE), polyethyleneterephthalate (PET), polyvinyl chloride, latex, natural rubber, synthetic rubber, silicone and mixtures and copolymers thereof.

11. The method of claim 1, wherein the elongated tubular member further comprises at least one cuff positioned on the wall of the elongated tubular member at the proximal region.

12. The method of claim 11, wherein the at least one cuff includes spaced apart first and second cuffs.

13. The method of claim 1 wherein the expandable member comprises a silicone sheath that defines a cavity with a closed cell foam insert.

14. The method of claim 1 wherein the expandable member comprises a silicone sheath that defines a cavity with an open cell foam insert.

15. The method of claim 1 wherein the wall of the elongated tubular member further comprises a radiopaque stripe extending from the proximal region to the distal region.

16. The method of claim 1 wherein the elongated tubular member further comprises a retractable non-expandable sheath disposed radially outside the expandable member to prevent expansion of the expandable member until it is desired that it be expanded.

17. The method of claim 1 wherein the elongated tubular member further comprises a fitting mechanism operatively engaged to the proximal region of the elongated tubular member, wherein the fitting mechanism is capable of controlling fluid flow through the first lumen.

18. The method of claim 17 wherein the fitting mechanism comprises a passage in fluid communication with the first lumen.

19. The method of claim 17 wherein the fitting mechanism comprises a passage in fluid communication with the second lumen.

20. The method of claim 1 further comprising using a stylet to guide insertion of the device into the subject's peritoneal cavity.

21. The method of claim 1 further comprising using a cutting tool to create an opening into the subject's peritoneal cavity to insert the device.

* * * * *